US012758870B2

(12) United States Patent
Krishna et al.

(10) Patent No.: US 12,758,870 B2
(45) Date of Patent: Oct. 13, 2026

(54) METHODS AND APPARATUSES FOR SIGNALING ENHANCEMENT IN WIRELESS COMMUNICATIONS

(71) Applicant: InterDigital Patent Holdings, Inc., Wilmington, DE (US)

(72) Inventors: Renan Krishna, Brighton (GB); Chonggang Wang, Princeton, NJ (US); Xavier De Foy, Kirkland (CA); Shamim Rahman, Cote St. Luc (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 257 days.

(21) Appl. No.: 18/292,375

(22) PCT Filed: Aug. 4, 2022

(86) PCT No.: PCT/US2022/039452
§ 371 (c)(1),
(2) Date: Jan. 26, 2024

(87) PCT Pub. No.: WO2023/014901
PCT Pub. Date: Feb. 9, 2023

(65) Prior Publication Data

US 2024/0325883 A1 Oct. 3, 2024

Related U.S. Application Data

(60) Provisional application No. 63/230,601, filed on Aug. 6, 2021.

(51) Int. Cl.
*A63F 13/352* (2014.01)

(52) U.S. Cl.
CPC .................................. *A63F 13/352* (2014.09)

(58) Field of Classification Search
CPC ....... A63F 13/352; A63F 13/355; A63F 13/67
See application file for complete search history.

(56) References Cited

U.S. PATENT DOCUMENTS

2020/0142735 A1 5/2020 Maciocco et al.
2022/0029638 A1* 1/2022 Kim .................. H03M 13/6306
(Continued)

OTHER PUBLICATIONS

Claypool et al., "Latency and player actions in online games", Communication of the ACM 49.11 (2006), pp. 40-45.
(Continued)

*Primary Examiner* — Thomas J Dailey
(74) *Attorney, Agent, or Firm* — Chris Kolefas

(57) ABSTRACT

Methods and apparatuses for signaling enhancement to meet low-latency requirements of cloud gaming applications in wireless communication networks are provided. In an example, a method implemented by a wireless transmit/receive unit (WTRU) includes transmitting a first message including neural network data and information indicating a first type of neural network data, the neural network data were marshaled into one or more byte arrays before transmission; receiving a first acknowledgement message indicating a second type of neural network data that an Edge device has received; receiving a second message including marshaled data based on the transmitted neural network data and the information; and transmitting a second acknowledgement message indicating a third type of neural network data that the WTRU has received.

20 Claims, 27 Drawing Sheets

(56) References Cited

U.S. PATENT DOCUMENTS

2022/0124376 A1* 4/2022 Said ........................ H04N 19/44
2022/0261634 A1* 8/2022 Liu ........................ G06N 3/063

OTHER PUBLICATIONS

Taleb, N. "The Statistical Consequences of Fat Tails", STEM Academic Press, 2020.
Lavalle, S. M., et al., "Head tracking for the Oculus Rift", 2014 IEEE International Conference on Robotics and Automation (ICRA), IEEE, 2014 (8 pages).
https://www.nvidia.com/en-gb/geforce-now/ retrieved from wayback machine version dated May 31, 2021, 8 pages.
Satyanarayanan, Mahadev, et al., "The computing landscape of the 21st century", Proceedings of the 20th International Workshop on Mobile Computing Systems and Applications, HotMobile '19, Santa Cruz, CA, USA, Feb. 27-28, 2019, 6 pages.
Tan, Zhaowei, et al., "Supporting mobile VR in LTE networks: How close are we?", Proceedings of the ACM on Measurement and Analysis of Computing Systems, vol. 2, No. 1, Article 8 (2018), pp. 1-31.
Mao, Yixiang, et al., "Low-latency FoV-adaptive Coding and Streaming for Interactive 360° Video Streaming", Poster Session C3: Multimedia Transport and Delivery & Multimedia Analysis and Description, MM'Oct. 12-16, 20, 2020, Seattle, WA, USA, 10 pages.
Cuervo, Eduardo, et al. "Kahawai: High-quality mobile gaming using gpu offload." Proceedings of the 13th Annual International Conference on Mobile Systems, Applications, and Services. 2015.
Shea, Ryan, et al. "Cloud gaming: architecture and performance", IEEE Network, Jul./Aug. 2013, 16 pages.
"3rd Generation Partnership Project; Technical Specification Group Services and System Aspects; Extended Reality (XR) in 5G (Release 16)", 3GPP TR 26.928 V16.1.0, Dec. 2020, 131 pages.
Claypool, et al., "Latency and player actions in online games", Communications of the ACM 49.11 (2006), pp. 40-45.
Yan, Francis Y. et al., "Learning in situ: a randomized experiment in video streaming", 17th USENIX Symposium on Networked Systems Design and Implementation (NSDI '20), Santa Clara, USA, Feb. 25-27, 2020, 18 pages.
Crovella et al., "Internet measurement: infrastructure, traffic and applications", John Wiley and Sons Inc., 2006.
Teerapittayanon, Surat, et al., "Distributed deep neural networks over the cloud, the edge and end devices", 2017 IEEE 37th International Conference on Distributed Computing Systems (ICDCS), IEEE, 2017, 12 pages.
Goodfellow, et al., "Deep Learning", vol. 1, No. 2, Cambridge: MIT Press, 322-330 (2016) (Year: 2016), 8 pages.
Chen, Mingzhe et al., "Artificial Neural Networks-Based Machine Learning for Wireless Networks: A Tutorial" IEEE Communications Surveys & Tutorials, vol. 21, No. 4, Nov. 26, 2019, 34 pages.
Lee et al., "Outatime Using Speculation to Enable Low-Latency Continuous Interaction for Mobile Cloud Gaming", MobiSys '15: Proceedings of the 13th Annual International Conference on Mobile Systems, Applications and Services, May 2015, 15 pages.
Munakata, Atsuya et al., "Prediction of Impulsive Input on Gamepad Using Force-Sensitive Resistor", Proceedings of the Fourteenth International Conference on Tangible, Embedded, and Embodied Interaction, TEI '20, Sydney, Australia, Feb. 9-12, 2020, 7 pages.
"Bandwidth, data usage, and steam quality", Stadia Help, Mar. 23, 2021, 3 pages.
https://www.playstation.com/en-gb/ps-now/ retrieved from wayback machine dated Jun. 1, 2021, 10 pages.

* cited by examiner

METHODS AND APPARATUSES FOR SIGNALING ENHANCEMENT IN WIRELESS COMMUNICATIONS

CROSS-REFERENCE TO RELATED APPLICATION(S)

This application is a U.S. National Stage Application under 35 U.S.C. 371 of International Patent Application No. PCT/US2022/039452, filed Aug. 4, 2022, which claims priority to and the benefit of U.S. Provisional Application No. 63/230,601 filed in the U.S. Patent and Trademark Office on Aug. 6, 2021, the entire contents of each of which being incorporated herein by reference as if fully set forth below in its entirety, and for all applicable purposes.

SUMMARY

This disclosure relates to communication networks, wireless and/or wired. For example, one or more embodiments disclosed herein are related to methods and apparatus for enhancement of cloud gaming applications on terminal devices. Methods, procedures, and architectures to meet low-latency requirements of cloud gaming applications on terminal devices (e.g., WTRUs or UEs) are provided.

In one embodiment, methods and apparatuses for signaling enhancement to meet low-latency requirements of cloud gaming applications in wireless communication networks are provided. In an example, a method implemented by a wireless transmit/receive unit (WTRU) includes transmitting a first message including neural network data and information indicating a first type of neural network data, the neural network data were marshaled into one or more byte arrays before transmission; receiving a first acknowledgement message indicating a second type of neural network data that an Edge device has received; receiving a second message including marshaled data based on the transmitted neural network data and the information; and transmitting a second acknowledgement message indicating a third type of neural network data that the WTRU has received.

In one embodiment, methods, procedures, and components to communicate distributed Neural Network data between a WTRU and an edge entity are provided.

In one embodiment, methods, procedures, and components to communicate in-situ data (data that is being generated as the user plays the game) between a WTRU and an edge entity are provided.

In one embodiment, methods, procedures, and components to communicate user action predictions between a WTRU and an edge entity are provided.

In one embodiment, methods, procedures, and components to decide which computations need to be done a WTRU are provided.

In one embodiment, methods, procedures, and components to decide which computations need to be done on an edge entity are provided.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGS.) and the detailed description are not to be considered limiting, and other equally effective examples are possible and likely. Furthermore, like reference numerals ("ref.") in the FIGS. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Communications Networks and Devices

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
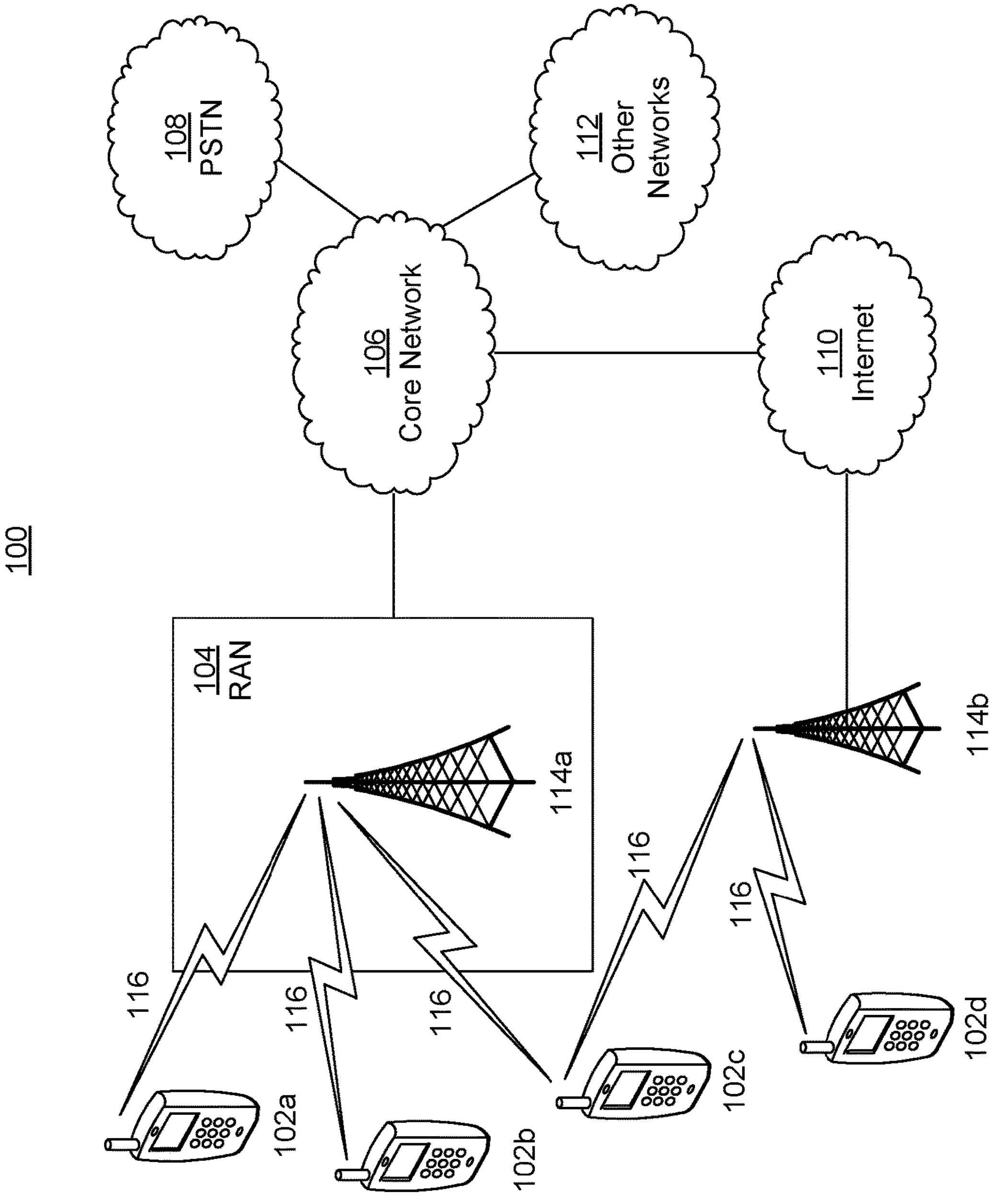
FIG. 1A is a system diagram illustrating an example communications system in which one or more disclosed embodiments may be implemented.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114_a_ in the RAN 104/113 and the WTRUs 102_a_, 102_b_, 102_c_ may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114_a_ and the WTRUs 102_a_, 102_b_, 102_c_ may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114_a_ and the WTRUs 102_a_, 102_b_, 102_c_ may implement a radio technology such as NR Radio Access, which may establish the air interface 116 using New Radio (NR).

In an embodiment, the base station 114_a_ and the WTRUs 102_a_, 102_b_, 102_c_ may implement multiple radio access technologies. For example, the base station 114_a_ and the WTRUs 102_a_, 102_b_, 102_c_ may implement LTE radio access and NR radio access together, for instance using dual connectivity (DC) principles. Thus, the air interface utilized by WTRUs 102_a_, 102_b_, 102_c_ may be characterized by multiple types of radio access technologies and/or transmissions sent to/from multiple types of base stations (e.g., an eNB and a gNB).

In an embodiment, the base station 114_a_ and the WTRUs 102_a_, 102_b_, 102_c_ may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114_b_ in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114_b_ and the WTRUs 102_c_, 102_d_ may implement a radio technology such as IEEE 802.11 to establish a wireless local area network (WLAN). In an embodiment, the base station 114_b_ and the WTRUs 102_c_, 102_d_ may implement a radio technology such as IEEE 802.15 to establish a wireless personal area network (WPAN). In an embodiment, the base station 114_b_ and the WTRUs 102_c_, 102_d_ may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114_b_ may have a direct connection to the Internet 110. Thus, the base station 114_b_ may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102_a_, 102_b_, 102_c_, 102_d_. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102_a_, 102_b_, 102_c_, 102_d_ to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102_a_, 102_b_, 102_c_, 102_d_ in the communications system 100 may include multi-mode capabilities (e.g., the WTRUs 102_a_, 102_b_, 102_c_, 102_d_ may include multiple transceivers for communicating with different wireless networks over different wireless links). For example, the WTRU 102_c_ shown in FIG. 1A may be configured to communicate with the base station 114_a_, which may employ a cellular-based radio technology, and with the base station 114_b_, which may employ an IEEE 802 radio technology.

Figure 1B:
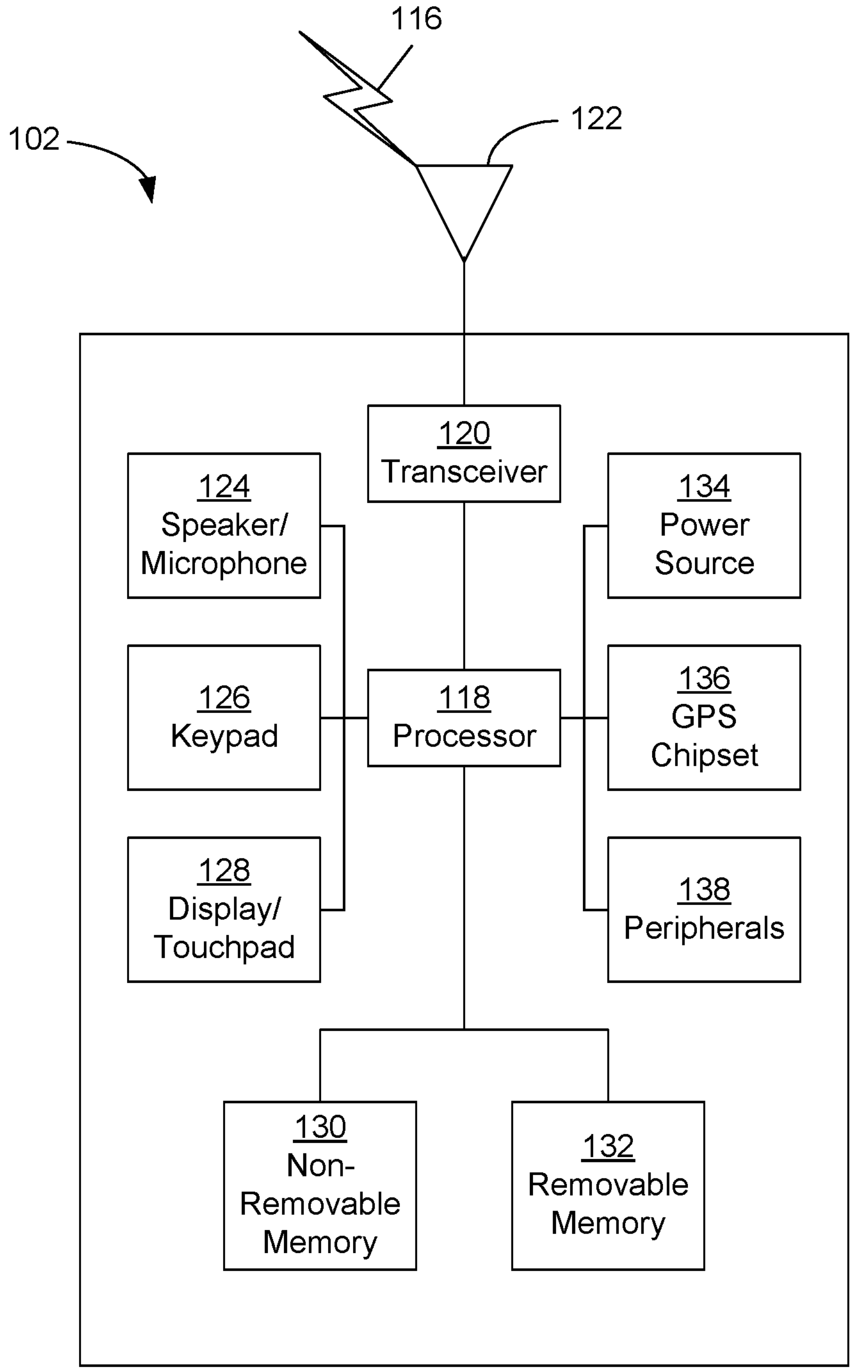
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
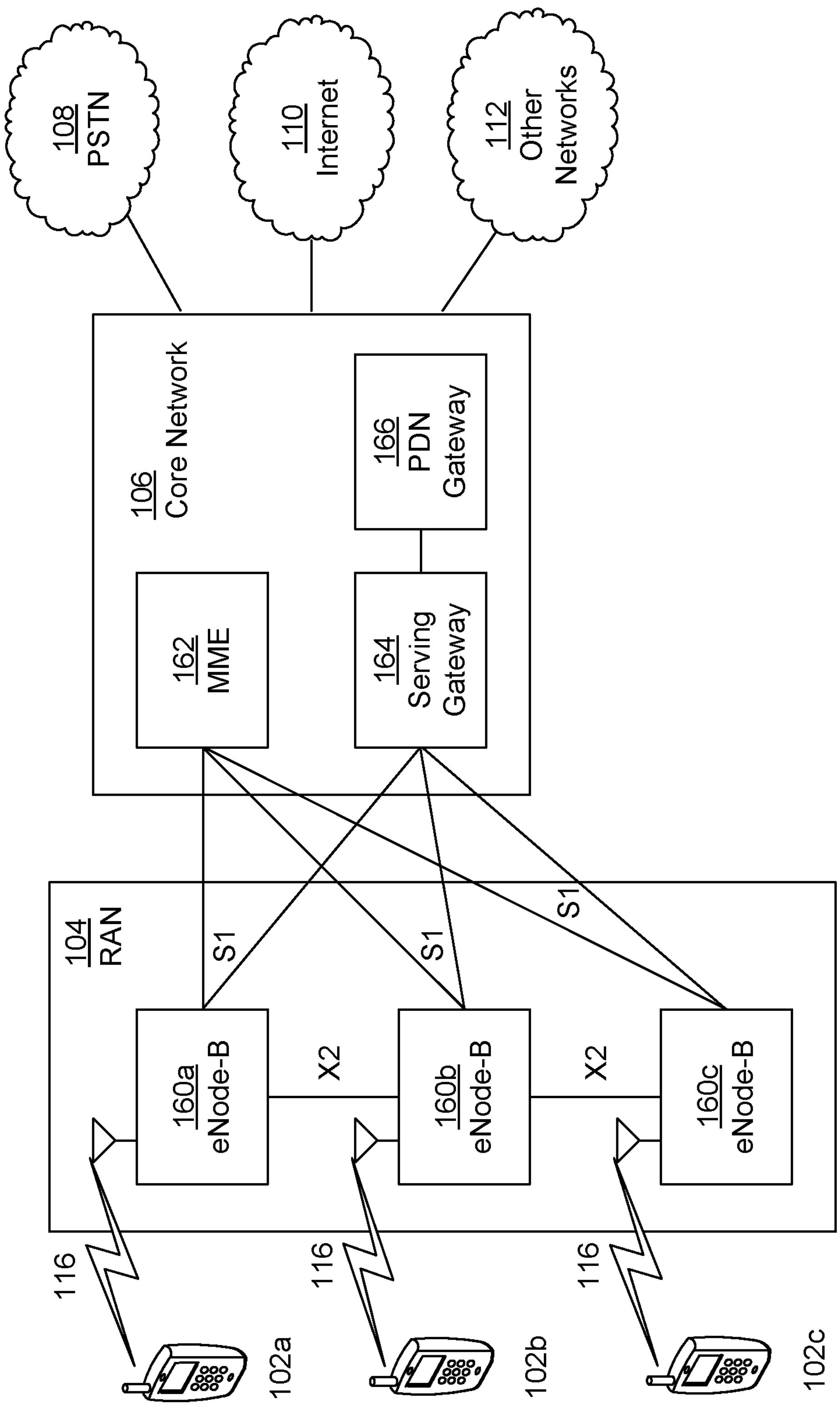
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
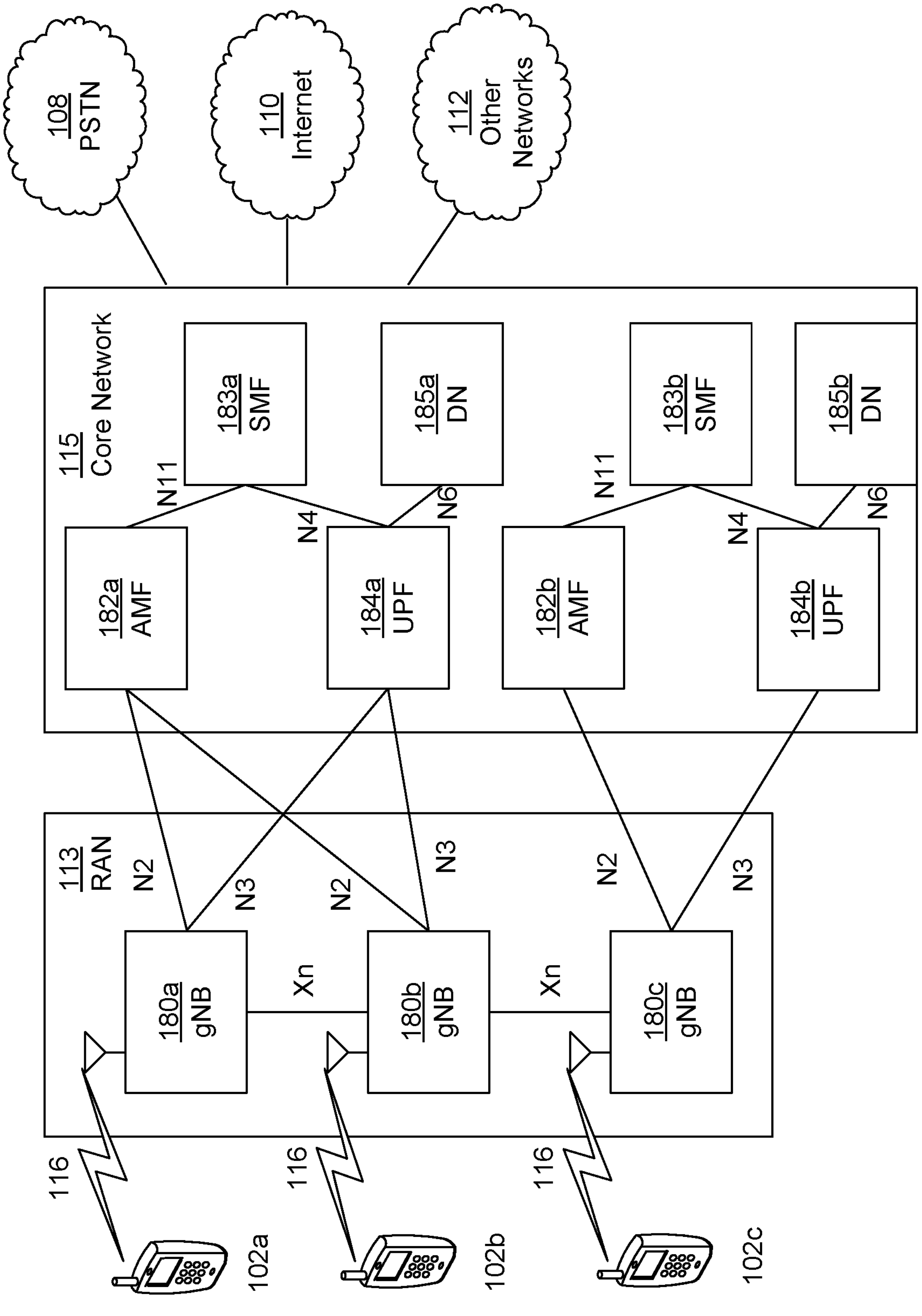
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a*-c, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

Current cloud gaming providers, such as Onlive, Gaikai, Google Stadia, GeForce Now, PS Now, run their game logic, GPU rendering, and video encoding modules in the cloud (e.g., data centers towards the core of the Internet). However, this introduces unpredictable latencies resulting in poor Quality of Experience (QoE) for the user in certain scenarios (e.g., high traffic times). This poor QoE is a result of very strict delay threshold requirements of various game types. For example delay thresholds for first person shooter games, role-playing games, and real-time strategy games are respectively 100 ms, 500 ms, and 1000 ms. Indeed, 3GPP TR 26.928 [12] document specifies that 45 ms-60 ms are more accurate estimates of acceptable latency in games that are fast paced. As such, new or improved methods, procedures and architectures may be desired to reduce network latency within the best-effort service model of the current networks/systems.

Figure 2:
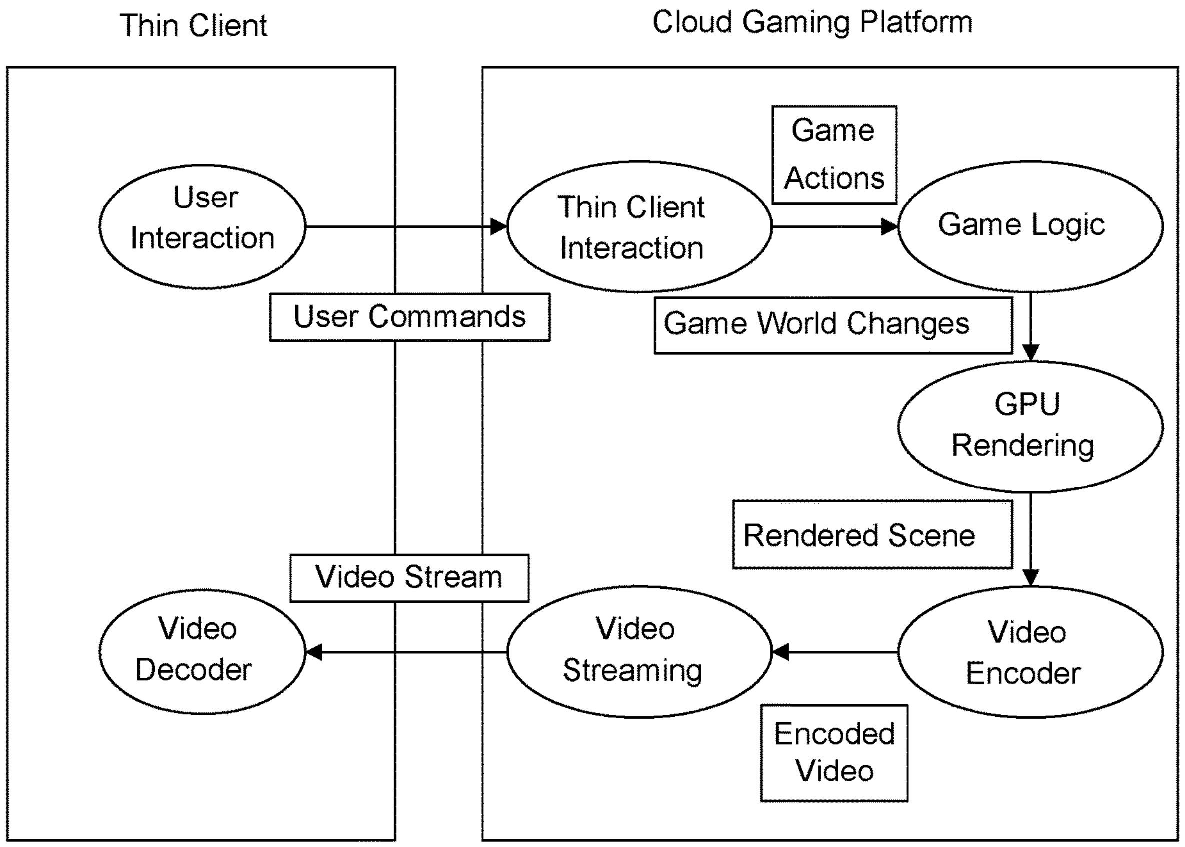
FIG. 2 is a diagram illustrating an example architecture for Cloud Gaming.

FIG. 2 (refer to [6]) shows an example architecture used by cloud gaming platforms. A thin client with the software components "User Interaction" and "Video Decoder" runs on a WTRU (or a User Equipment (UE)). The user's actions in the game are captured by the "User Interaction" module and are sent as "User Commands" by the WTRU over a network to the cloud gaming platform running in a remote data center. This data center's cloud gaming platform has a component called the "Thin Client Interaction" that receives the user commands from the client and converts them into "Game Actions". Next, the "Game Actions" are interpreted as changes in the game world by the "Game Logic" module of the cloud gaming platform. These world changes are then converted into "Rendered Scene" by the "GPU Rendering" module. The "GPU Rendering" module then forwards the "Rendered Scene" to a "Video Encoder" which encodes (including compression) the video and sends that video to the "Video Streaming" module. Finally, the "Video Streaming" module sends the "Encoded Video" as a "Video Stream" over the network back to the thin client. This thin client's "Video Decoder" component then decodes the video and displays it on the WTRU for the user.

Figure 3:
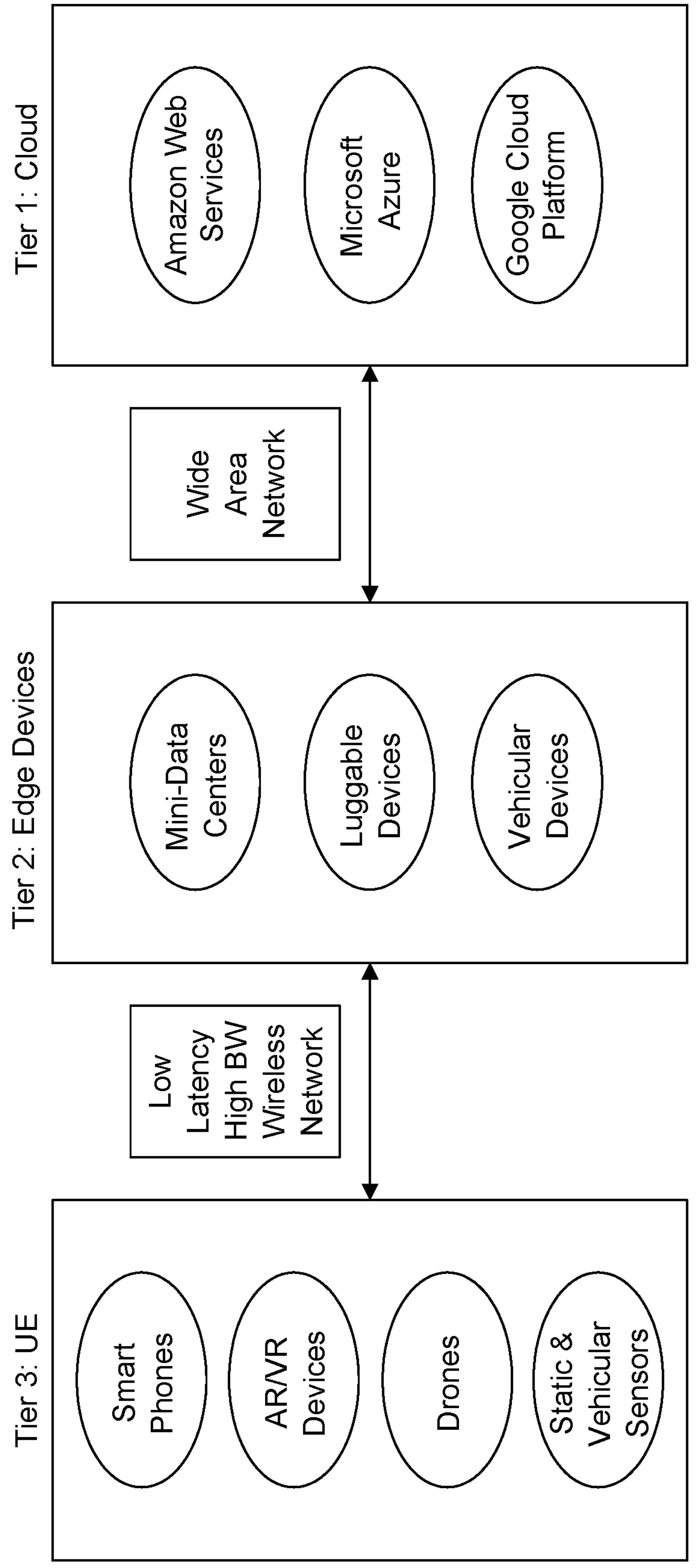
FIG. 3 is a diagram illustrating an example of a tiered model of computing.

FIG. 3 shows an example of how an end-to-end path (between a WTRU and Cloud) is segmented into three distinct tiers [7] and used by cloud gaming platforms, such as Google Stadia [8], GeForce Now[9], PS Now [10], Outatime [1], and/or Kahawi [11]. Each tier has common design considerations relevant to that tier.

Tier 1 represents the three design considerations [7] of compute elasticity, storage permanence and hardware consolidation. The compute elasticity design consideration requires that new machines can be quickly spun-up or old machines be powered down depending on the demand for their resources. The storage permanence design consideration requires redundancy of storage using for example Redundant Array of Independent Disks (RAID), a stability of infrastructure and practices that require data backup and disaster recovery. Finally, the hardware consolidation design consideration requires that operational costs be amortized over a large number of machines in a data center. Commercial examples of services that are provided using Tier 1 infrastructure include but are not limited to Amazon Web Services, Microsoft Azure, and the Google Cloud Platform.

Tier 2 represents the design consideration [7] of network proximity. This consideration requires that mini data center with a small number of servers be provided closer to the location of WTRUs. This proximity is quantified in terms of low round-trip-times (RTT) and the availability of high bandwidth connectivity between the WTRU and a tier 2 server. Tier 2 mini data centers are also known as Edge Computing devices. Examples of devices used to provide tier 2 infrastructure include but not limited to mini data centers, luggable devices, and vehicular devices.

Tier 3 represents design considerations [7] of mobility and sensing. The mobility design consideration requires that the devices used in this tier are mobile. This places constraints on the weight, size, heat dissipation and the battery life of such devices. The sensing design consideration requires that the device used at tier 3 should support sensors such as GPS, microphones, accelerometers, gyroscopes, and video cameras. Notice that the tier 3 devices themselves might not be able to provide the necessary processing power necessary to analyze the data from the afore-mentioned sensors. Examples of tier 3 devices include smart phones, Augmented Reality/Virtual Reality (AR/VR) devices, drones, and sensors that are static or on vehicles.

Current Approaches to Reduce Response Time Below Delay Threshold by Predicting Future User Game Actions As discussed above, one of the key challenges in designing a system for cloud gaming is the issue of delay threshold that causes a perceptible difference in the user's gaming experience. In an example, delays of 60 ms can be perceived by the players and anything beyond 100 ms makes a first-person shooter game unplayable [13].

As shown in FIG. 2, the current cloud gaming architectures are organized around a game loop that starts with a WTRU sending the user's commands and ends with the Cloud gaming platform returning a resultant video frame. Assuming that the frames are being generated at a rate of 30 fps, the time taken to return the resultant frame is 33 ms (1/30 approximately) plus (+) the network latency between the WTRU and the cloud gaming system. This is essentially the response time that this cloud gaming system takes from when the user inputs the game command to when the corresponding frame is rendered on the user's device. This response time is equal to or below the desired 100 ms only if the time taken to generate the frame is equal to or below 33 ms and the network latency is equal to or below 67 ms. The response time without the overhead of network latency is called as "frame time". Thus, the frame time is 33 ms when assuming the frame rate to be 30 fps.

Some related work has been done to reduce the response time and to improve gaming experience by predicting actions in the game that the user might make in the future. For example, Outatime [1] uses a Markov-based prediction model running on a cloud server to predict a user's next action in a game. This is done by examining the user's historical tendencies and current inputs to forecast expected future inputs. These future inputs are then used to render multiple possible frame outputs that occur RTT milliseconds into the future. The WTRU is a thin client that receives frames from the server and displays an appropriate frame to the user.

Figure 4:
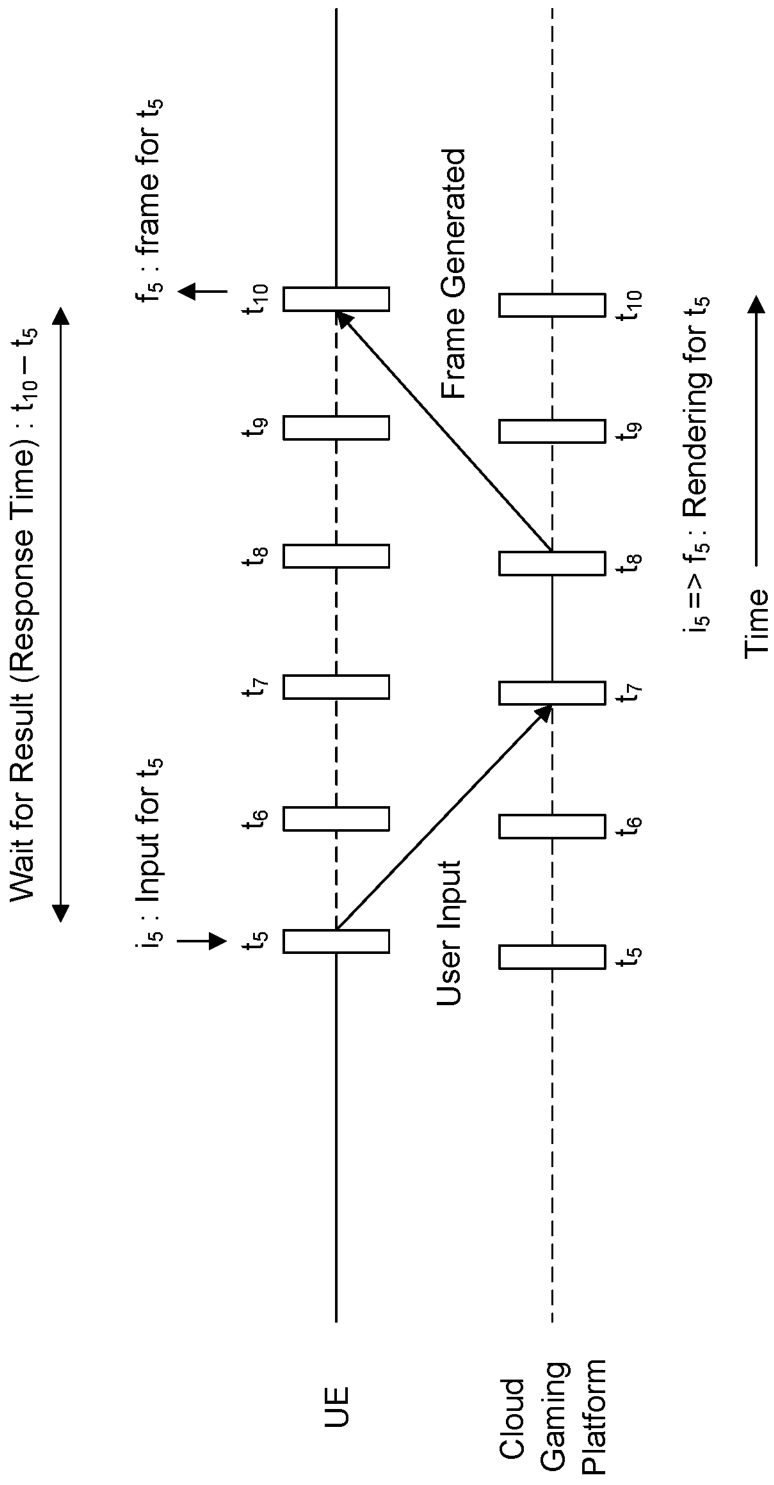
FIG. 4 is a diagram illustrating an example of Cloud Gaming application having response time depends on network latency.

Referring to FIG. 4, it is shown that how response time depends on latency when the user's next game action on the WTRU is not predicted. We discretize time at 33 ms (which is the frame time as defined above) per clock tick. At clock tick t5, the user's input i5 is sent to the server on the cloud. Assuming an RTT of 4 clock ticks (4×33=132 ms), the user input reaches the server after 2 clock ticks at t7. On the server, it takes one clock tick till t8 to generate the appropriate frame f5. This frame reaches the client 2 clock ticks later at t10 as shown in the figure. Thus the total response time is 5 clock ticks which is 5×33=165 ms. The response time can increase by the amount equal to an RTT (4 clock ticks).

Figure 5:
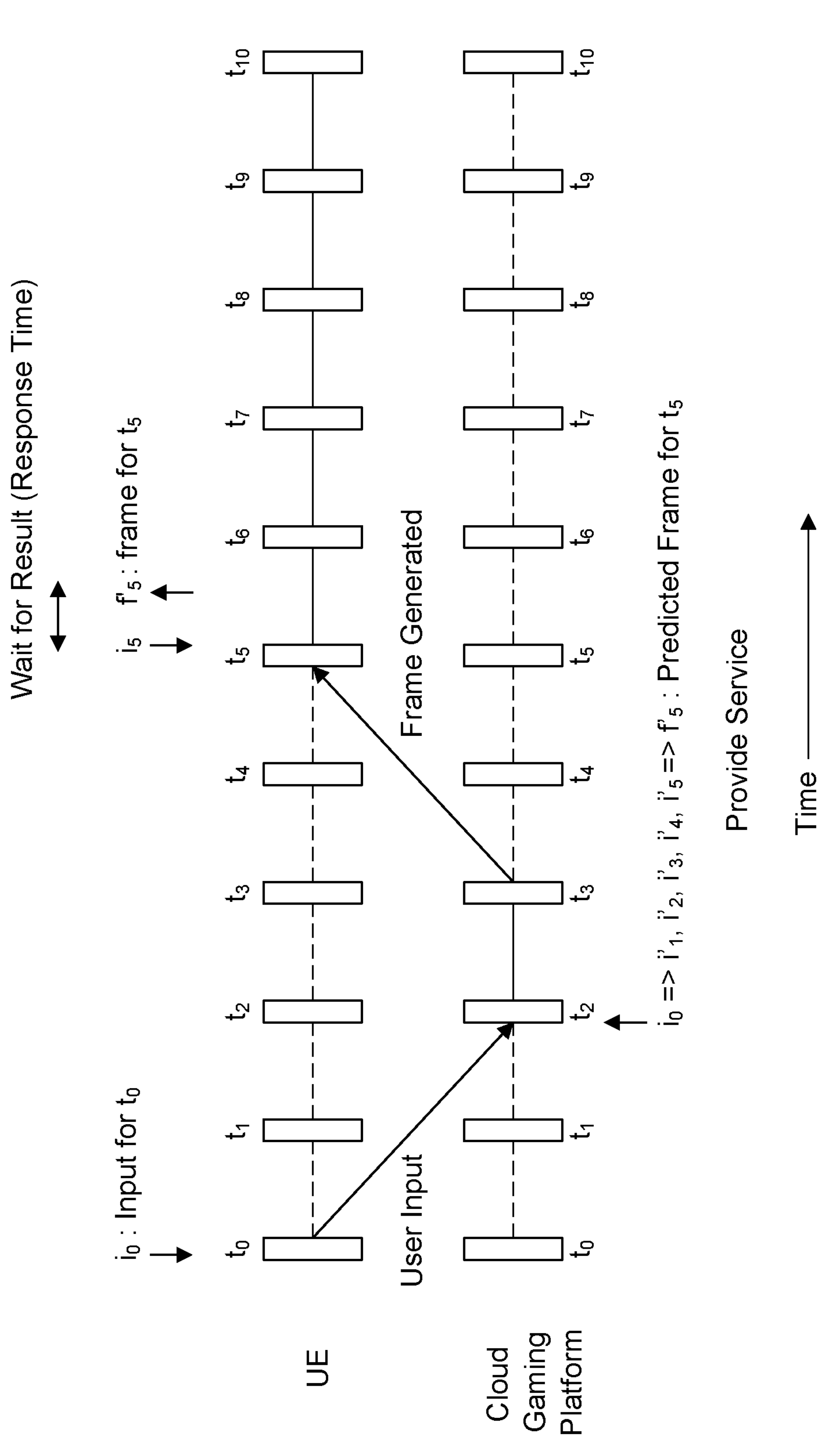
FIG. 5 is a diagram illustrating an example of user action prediction having low response time.

Referring to FIG. 5, it is shown that how the effects of network latency can be mitigated by predicting user's actions in advance and generating the corresponding frame that is then sent to the WTRU. Again, each clock tick in FIG. 5 corresponds to a discrete time of 33 ms. At t0, the user's input i0 is sent to the server. Assuming an RTT of 4 clock ticks, the input i0 reaches the server at time t2. The server then predicts the user input sequence for say 1 RTT in future and sends the predicted input i'5's corresponding frame f'5 to the WTRU. This predicted frame f'5 is then rendered on the WTRU if the prediction is accurate. As shown in FIG. 5, the response time between i5 and f'5 is now considerably reduced.

Munakata et al. [2] predicts impulsive input from a game player's finger on a gamepad developed for a cloud gaming scenario. The prediction algorithm uses edge detection for recognizing changes in pressure and gradient.

Zhaowei et al. [3] predict those variables whose values are a consequence of the user's actions. Firstly, they predict the time of the next mobile tower handover as the user is moving around while playing the game. This done by inferring a base station's decision algorithm using a mapping from WTRU's measurements of base station's radio signal strength to the response back from the network. Secondly, they predict the time of arrival of an uplink packet based on their observation that traffic is small and periodic.

LaValle et al. [4] use Bayesian filtering techniques to predictively track a user's head pose when they are playing a game using an Oculus Rift headset. An accurate prediction of the user's head pose helps in reduction of the time lag between head movement and the appearance of an appropriate image on their retina. This reduction of time lag is important to prevent simulator sickness that is commonly associated with the use of AR/VR headsets such as the Oculus Rift.

Using Deep Neural Networks (DNN) In-Situ

Figure 6:
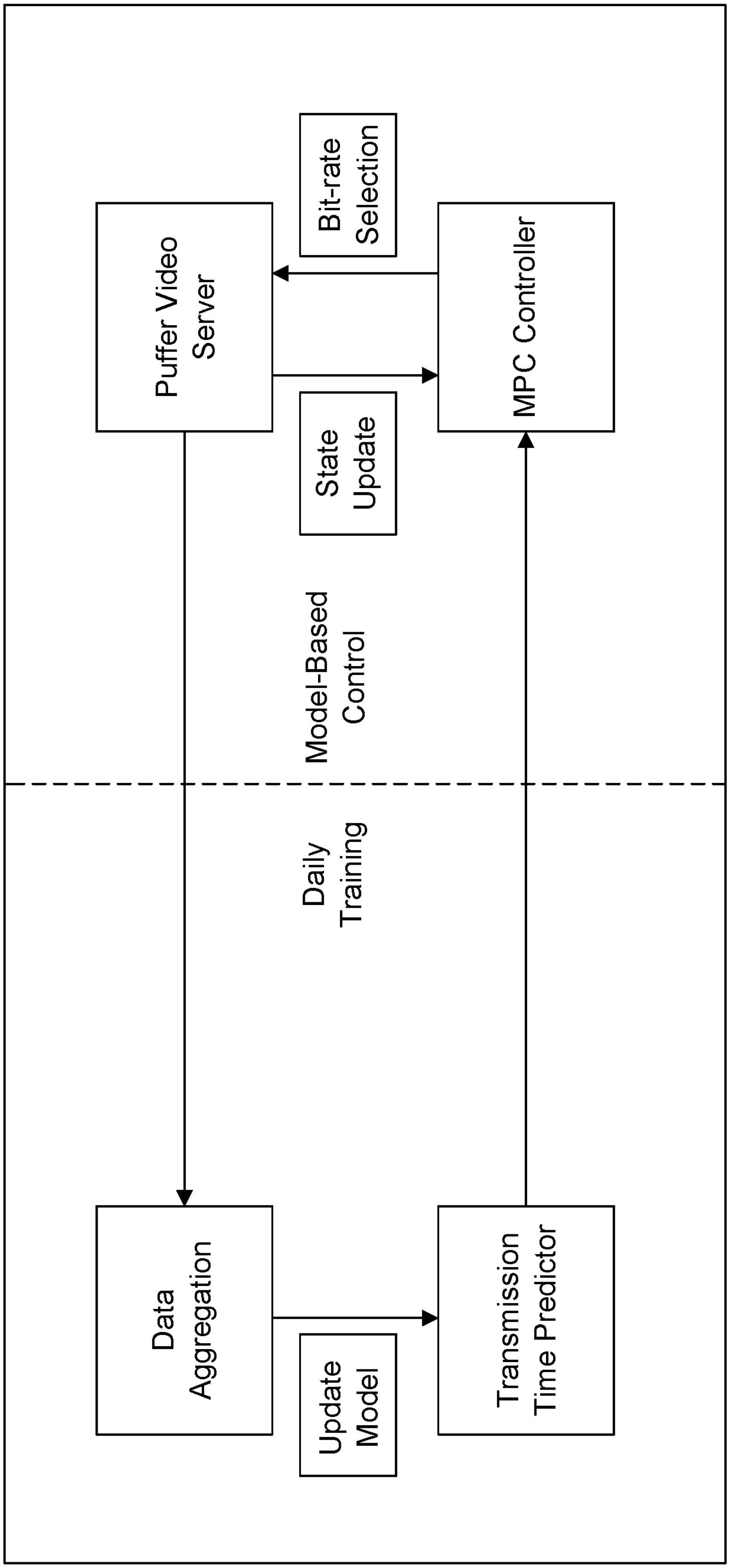
FIG. 6 is a diagram illustrating an example of components of a FUGU ABR algorithm.

Yan et al. [5] present an Adaptive-Bit-Rate (ABR) algorithm called FUGU that runs on the server side. It uses a Deep Neural Network (DNN) trained predictor as an input to a Model-Predictive-Controller (MPC) algorithm which is a classical control policy. The DNN is trained in-situ (online) with live data from the deployment environment. This environment is a video streaming server called "PUFFER" that is open to public. FIG. 6 shows an architecture of the FUGU ABR algorithm components. The "Transmission Time Predictor" Component is a DNN that estimates a probability distribution for the transmission time of data with a given file size. This DNN is updated by the "Data Aggregator" component once a day. This "Data Aggregator" component aggregates data that it receives from the PUFFER video server and updates the "Transmission Time Predictor". The "Transmission Time Predictor's" estimated probability distribution is used by the "MPC Controller" to select an appropriate bit rate. The PUFFER video server then serves the videos to the clients at this selected bit-rate and also updates the "MPC Controller" about the current state. In some cases, both the DNN named "Transmission Time Predictor" and the MPC are not partitioned between the client and server.

Current Techniques for User Action Prediction(s)

In current approaches for user action prediction, none of the approaches use distributed, in-situ Deep Neural Network (DNN) based techniques to predict user actions in a Cloud Gaming Scenario.

DNN is a representational learning technique that can be used to extract higher level abstract features from raw data [14]. These abstract features can then be used as a basis for computing a learned function that can map a new example to a predicted output.

In Cloud gaming, it may be desired simultaneously for an online (in-situ: data that is being generated as the user plays the game) learning DNN model that is also distributed between the WTRU and the Edge. Although systems other than cloud gaming have deployed online learning models [5], these models are not distributed between the WTRU and the Edge. On the other hand, systems other than cloud gaming that have deployed distributed DNNs [15] do not use in-situ learning models.

Offline Learning Mode DNNs for Predictions in Cloud Gaming

Due to the heavy tailed nature of parameters such as network bandwidth, buffer occupancy the predictions using offline models for cloud gaming applications are inaccurate. This is because for such heavy-tailed distributions, the law of large numbers works too slowly to be of any practical use. Another problem with such distributions is that mean of sample and that of the distribution is not equal as a result of which standard deviation and variance cannot be used as inputs for computing predictions [17]. Moreover, such distributions suffer from “expectation paradox” [16] where future occurrence of an event is proportional to the time elapsed for a past occurrence of the event. Finally, large rare events distort the distributions as a result of mismatch between the count and size of events [16].

As such, if DNN-based techniques are be used to predict user’s next action in a game, an online (in-situ) learning DNN model may be required or desired.

Centralized Location of DNN Data Structures in Cloud Gaming

Cloud Gaming applications running on a WTRU that could potentially use a DNN data structure running on the Edge suffer from high communication costs. This is because all the raw data required for training the DNN will need to be sent for processing to the Edge server and the resulting predictions sent back to the WTRU. This data is in addition to the cloud gaming data itself which includes high resolution video data and encoding of user actions thereby putting additional burden on the bandwidth requirement of the wireless link between the WTRU and the Edge. Moreover, the WTRU needs to wait for all predictions from the Edge and as already discussed previously, depending on the network latency of the wireless link, the quality of experience of the game can vary greatly.

On the other hand, current techniques that use distributed DNN [15] enable a smaller DNN on the end device to be used for approximate predictions. This entails using shallow portions of the DNN on the end device for an early exit and faster approximate predictions. These predictions can then be fed into a larger DNN on the Edge device for a more accurate prediction. However, the learning models used in such distributed DNNs are not in-situ and this leads to the issues discussed above related to the offline learning mode DNNs for predictions in Cloud Gaming.

As such, if DNN-based techniques are to be used to predict user’s next action in a game, the online (in-situ) learning DNN model needs to be distributed between the WTRU and the Edge.

Overview

In Cloud gaming, it may simultaneously need an online (in situ) learning DNN model that is also distributed between the WTRU and the Edge (as discussed above) to deliver a low-latency experience to a cloud gaming user (e.g., on a WTRU). This requires a novel or improved architecture of software (and/or hardware) components at the WTRU and/or the Edge. The architecture may be enabled by novel procedures and mechanisms to enable the architectural components to deliver low latency. In an example described later, a design of a novel architecture is provided that simultaneously supports an online DNN model that is distributed between the UE and the Edge. In another example, novel procedures and mechanisms that supports the delivery of latency by such an architecture in a cloud gaming scenario are provided.

Architectural Components to Achieve Low Latency

In one embodiment, novel arrangement of software components is provided to enable a terminal device to run cloud gaming applications that deliver a low latency experience on a WTRU.

Figure 7:
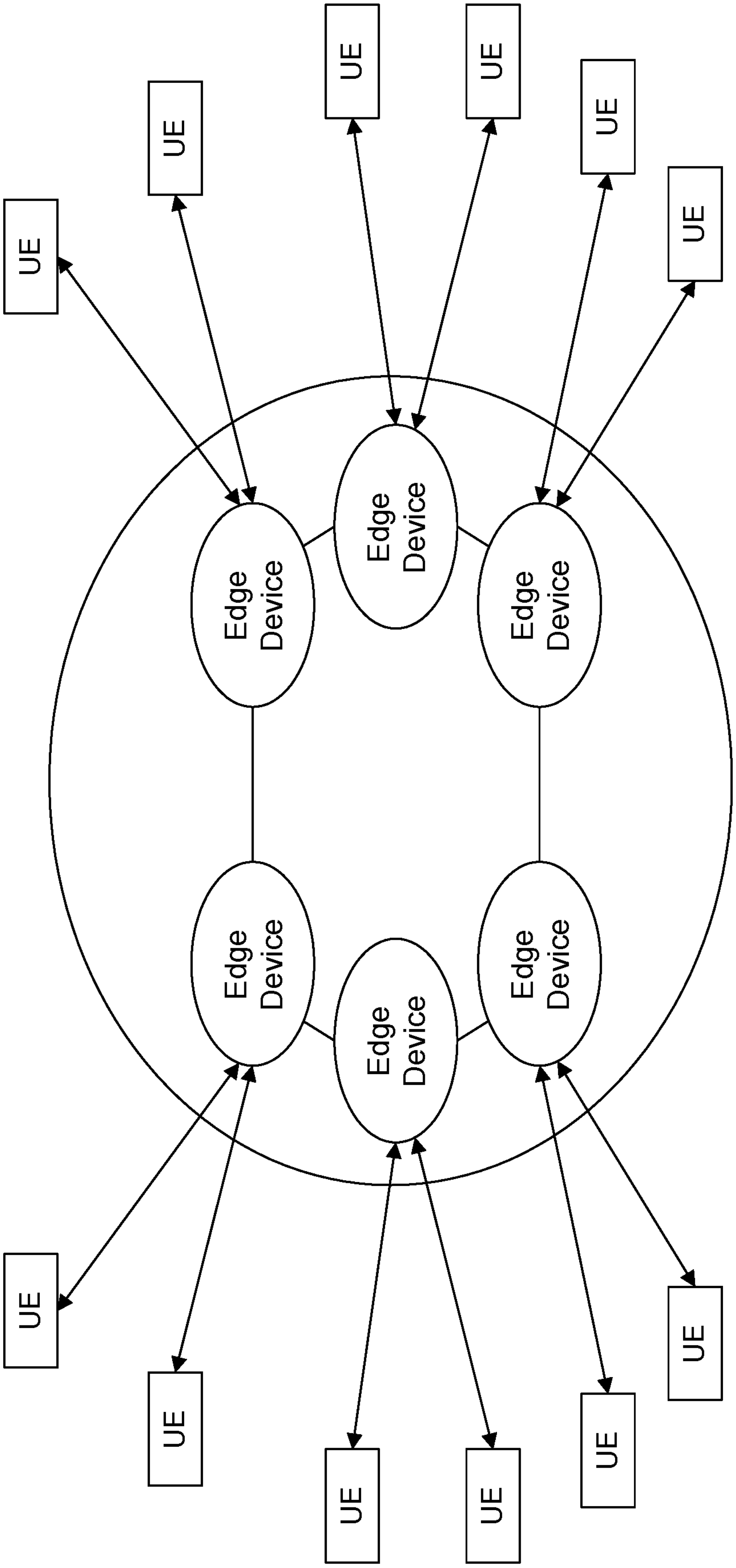
FIG. 7 is a diagram illustrating an example system of a network supporting flow of ML data over peer-to-peer WebRTC channel.

FIG. 7 shows a high-level view of the architectural components and the relationships among them. Each WTRU is connected wirelessly to an allocated Edge device that runs the cloud gaming software. The Edge devices themselves could be connected in a logical topology of for example any of the following (but not limited to) geometric arrangements: Hypercube and Tori, Butterfly network, de Bruijn graphs, Ring, and/or XOR geometry.

The Edge devices cooperate to disseminate the necessary cloud gaming information from a given WTRU to a subset of other WTRUs. The WTRUs themselves use point-to-point messages to communicate with their designated Edge device(s).

Requirements for the WTRU Architecture and the Supporting Edge Device Architecture The new architecture provides mechanisms that combine the following two properties: 1) support components that can learn in-situ (online) from the live data being produced as the game is being played. This mitigates the problem of heavy tailed training data; and 2) support the layers of the Trained Neural Network running on the WTRU to communicate with the layers of the Trained Neural Network running on the Edge device. This ensures that approximate predictions are generated on the WTRU itself thereby solving the issue discussed related to the centralized location of DNN data structures in Cloud Gaming.

Architecture Running on a WTRU

Figure 8:
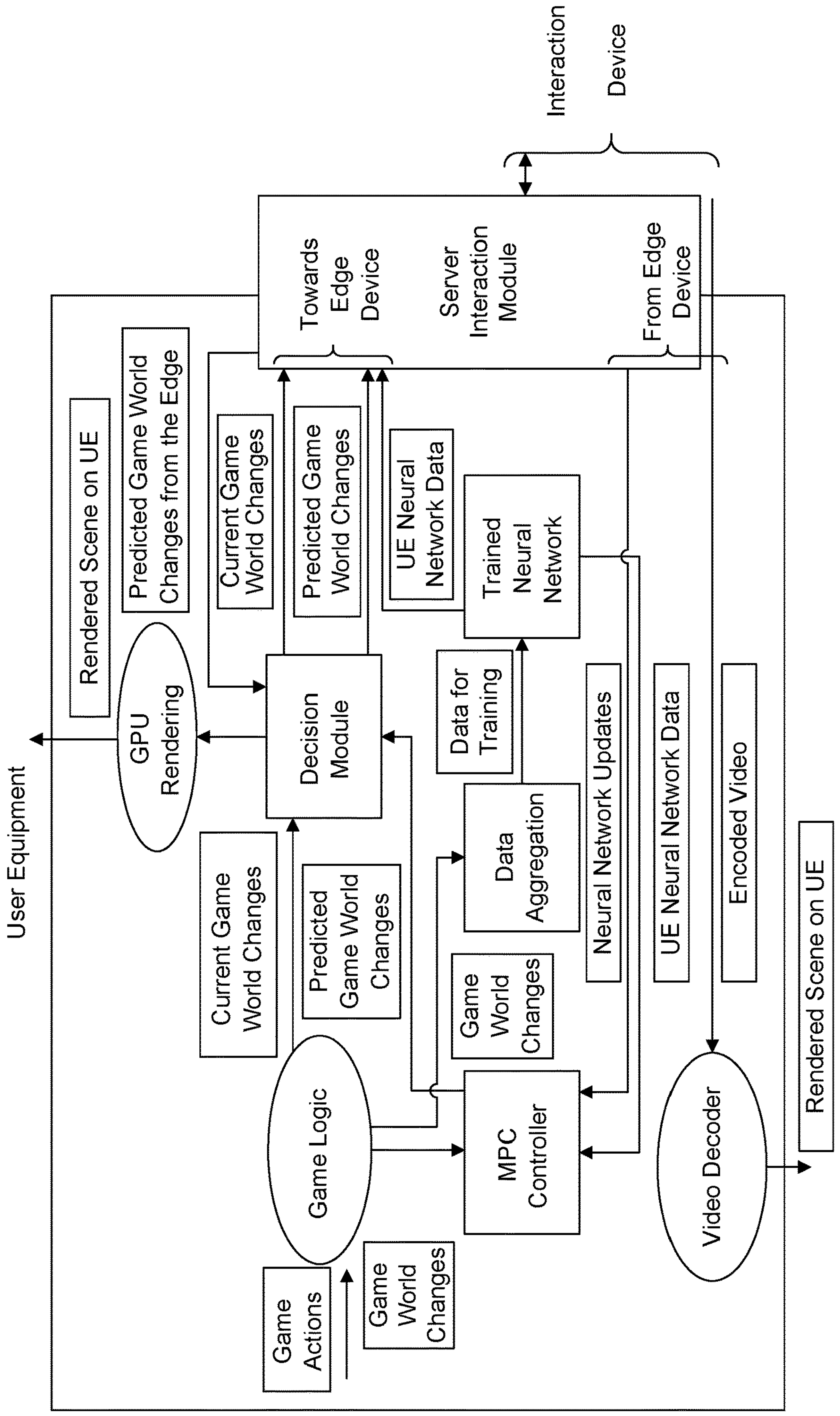
FIG. 8 is a diagram illustrating an example architecture of the novel system running on a WTRU.

In one embodiment, an architecture of the proposed system is provided for (or running on) a WTRU or UE to deliver low latency to Cloud Gaming Applications. For example, referring to FIG. 8, the architecture comprises one or more of the following components whose inputs and outputs are discussed below:

Game Logic: the “Game Actions” by the user are interpreted as changes in the game world by the “Game Logic” module of the WTRU. These changes can be carried as a data structure labelled “Game World Change” to the “Data Aggregation” or the “MPC Controller” module as shown in FIG. 8. In addition, these changes can be carried as a data structure labelled “Current World Changes” in FIG. 8 to the “Decision Module”.

GPU Rendering: This component’s one input can be “Current Game World Changes” carried in a data structure as shown in FIG. 8. This data is forwarded by the “Decision Module” and is originally coming from the “Game Logic” module on a WTRU. Another input can be “Predicted Game World Changes” carried in a data structure and forwarded by the “Decision Module”. FIG. 8 shows that this second input can come from the “MPC Controller” component either on the WTRU or on the Edge device. This “GPU Rendering” component converts those data structures into appropriate video frames as an output.

Video Decoder: This module can receive an “Encoded Video Stream” from the network and can decompress it in a video frame format appropriate for rendering a scene on the WTRU as shown in FIG. 8.

Server interaction Module: This module provides services that include but are not limited to marshalling arguments into byte arrays and un-marshalling the byte array replies back into a suitable data format, providing authentication services, naming and directory services, programming abstractions etc. To provide these services, it offers three procedures that can be invoked by other modules on the WTRU: sendGameChanges, sendPredictedGameChanges, sendNeuralNetData. These procedures are discussed in more details later. In addition, supplementary/helper procedures namely sendAck, getNeuralNetUpdates, and getPredictedAction are also made available.

Decision Module: This module can accept as an input "Current Game World Changes" carried in a data structure from the "Game Logic" component on UE as shown in FIG. 8. In addition, as shows in FIG. 8, it can accept "Predicted Game World Changes" carried in a data structure from either the "MPC Controller" component of WTRU or "MPC Controller" of the Edge device. Depending on the decision algorithm, both the "Current Game World Changes" data structure and the "Predicted Game World Changes" data structure can be output into the "GPU Rendering" module or a call can be made to "Server Interaction Module" 's sendGameChanges or sendPredictedGameChanges procedure for sending the respective data structures to the Edge device (see later description).

In one embodiment, the decision algorithm on the Decision Module selects one out of the following combination of choices: (a) Use low quality video rendering by WTRU's GPU Rendering module+use low quality prediction by WTRU's DNN; (b) Use low quality video rendering by WTRU's GPU Rendering module+use high quality prediction by Edge device's DNN; (c) Use low quality prediction by WTRU's DNN+use high quality video rendering by Edge device's GPU rendering module; (d) use high quality video rendering by Edge device's GPU rendering module+use high quality prediction by Edge device's DNN.

This choice is made in coordination with the Decision Module on the Edge device on the basis of an exchange of telemetry data. In one embodiment, the telemetry data may be the Round-trip time (RTT) between the WTRU and the Edge device.

MPC Controller: This module runs a Model-Predictive-Controller (MPC) algorithm which is a classical control policy. It takes predictions labelled "UE Neural Network Data" from the Deep Neural Network (DNN) trained predictor labelled "Trained Neural Network" in FIG. 8 (e.g., this prediction could be a point estimate whereas in another embodiment, it could be a probability distribution). These predictions can be used as an input to optimize an objective Quality of Experience (QoE) function. In one embodiment, the QoE is a function of the round-trip time (RTT). In addition, the MPC Controller can get updates of the game as current "Game World Changes" from the "Game Logic" module. The final input can be updates to the numerical parameters of the control algorithm from the Edge device's MPC Controller labelled "Neural Network Updates" in FIG. 8. The output of the MPC Controller is a data structure carrying the "Predicted Game World Changes" that can be sent to the "Decision Module".

Data Aggregation: The module can collect "Game World Changes" carried in a data structure from the WTRU's "Game Logic" module and use this data to train the DNN labelled "Trained Neural Network" as shown in FIG. 8. In an example, this training is done once a day.

Trained Neural Network: This component is a small DNN that can be run on a WTRU. However, because of its small size, this DNN can only produce approximate predictions based on the inputs from the "Data Aggregation" module of the WTRU discussed above. Its output is a prediction of the future state of the game. In an example, the predictions are in the form of a point estimate. In another example, the predictions are in the form of a probability distribution. These approximate predictions (labelled "UE Neural Network Data" in FIG. 8) can be used on the WTRU itself by the MPC Controller. Alternatively, it can be sent to the Edge device using the "Server Interaction Module" 's sendNeuralNetData procedure discussed later for further processing on a larger Neural Network.

Architecture Running on an Edge Device

Figure 9:
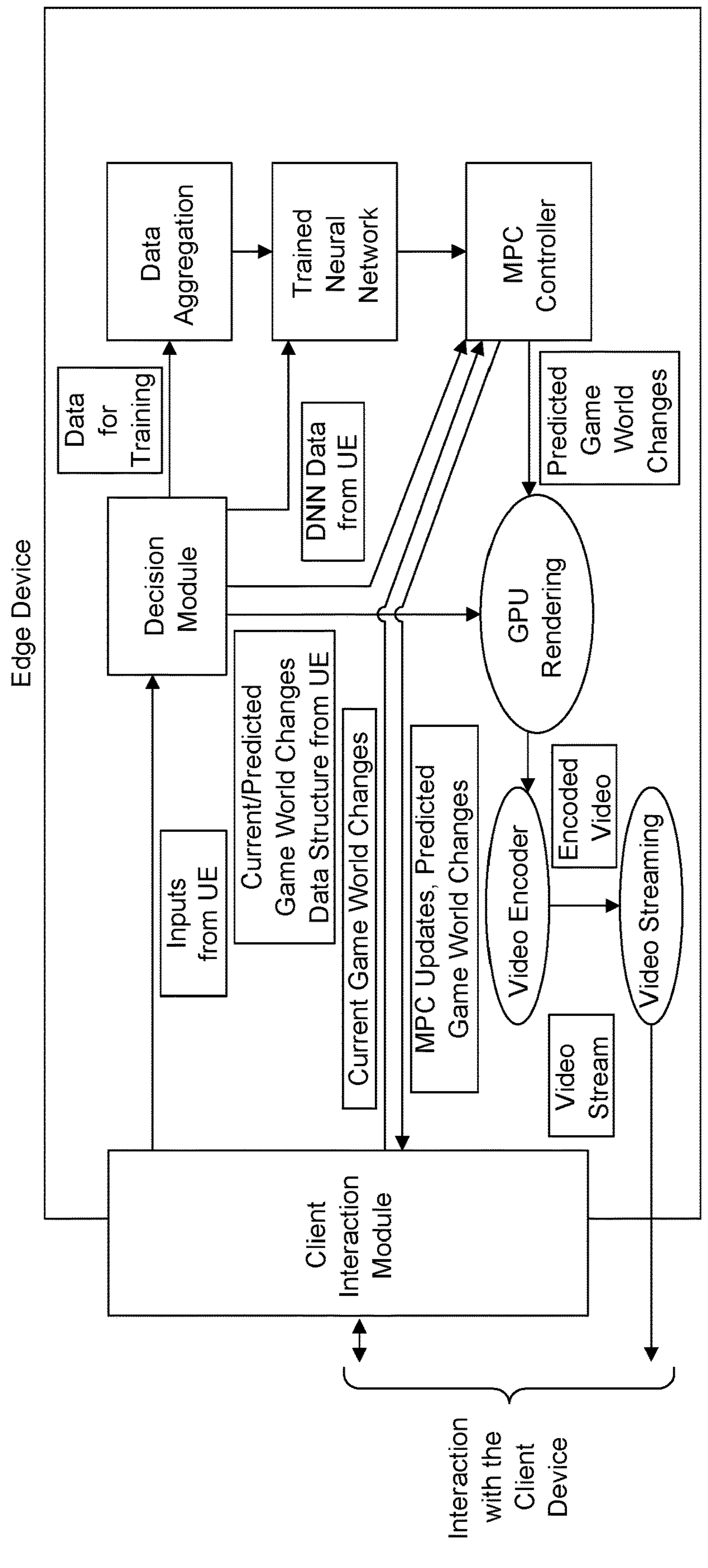
FIG. 9 is a diagram illustrating an example architecture of a system running on an Edge device.

In one embodiment, FIG. 9 shows an architecture having components running on an Edge device. This architecture comprises one or more of following components whose inputs and outputs are discussed below:

GPU Rendering: Its input can be a data structure carrying "Changes in the Game World" or a data structure carrying "Predicted Game World Changes" from the Edge's "Decision Module" and originally coming from a WTRU (labelled as "Current/Predicted Game World Changes" in FIG. 9). Another input can be a data structure carrying "Predicted Game World Changes" from the Edge's "MPC Controller" and triggered by the Edge's "Decision Module". The "GPU Rendering" module can convert the data structures into appropriate video frames as an output into the "Video Encoder" component of the Edge.

Client Interaction Module: This component gets its inputs from WTRU. These inputs fall into three categories as discussed above, "Current Game World Changes", "Predicted Game World Changes", and "UE Neural Network Data". This "Client Interaction module" can then forward these inputs to the "Decision Module". In addition, the "Current Game World Changes" can also be forwarded to the Edge's "MPC Controller". The "Client Interaction Module" provides services that include but are not limited to marshalling arguments into byte arrays and un-marshalling the byte array replies back into a suitable data format, authentication services, naming and directory services, programming abstractions etc. It provides the procedures sendNeuralNetUpdates, sendPredictedGameOutcomes, getGameChanges, getPredictedChanges, getUENeuralNetData and sendAck to other components on the Edge device.

MPC Controller. This module runs a Model-Predictive-Controller (MPC) algorithm which is a classical control policy. It takes predictions labelled "DNN data from UE" in FIG. 9 from the Deep Neural Network (DNN) trained predictor "Trained Neural Network" on the WTRU (FIG. 8) which is a low-quality prediction. Alternatively, it takes predictions as shown in FIG. 9 from the Deep Neural Network (DNN) trained predictor "Trained Neural network" on the Edge device which combines the low-quality prediction from WTRUs "Trained Neural Network" with Edge's own "Trained Neural Network". The decision to choose the prediction input from these two choices is made by the "Decision Module" on the Edge device discussed below.

In one embodiment, this prediction could be a point estimate whereas in another embodiment, it could be a probability distribution) as an input to optimize an objective Quality of Experience (QoE) function.

In one embodiment, the QoE is a function of the round-trip time (RTT). In addition, as shown in FIG. 9, the MPC Controller can get updates of the game as "Current Game World Changes" carried in a data structure from the "Game Logic" module on the WTRU and sent to the Edge device's "Server Interaction Module" from WTRU's "Client Interaction Module". One output of an MPC Controller can be a data structure carrying the "Predicted Game World Changes" that is sent to the "GPU Rendering" component on the Edge device as shown in FIG. 9. The second output can be updates to the numerical parameters of the control algorithm from the Edge device's "MPC Controller" to the WTRU's "MPC Controller" using the sendNeuralNetUpdates procedure of the Edge device's "Client interaction Module" and shown as output labelled "MPC Updates" in FIG. 9. The final output can be a data structure carrying "Predicted Game World Changes" that is sent to the UE via the sendPredictedGameOutcomes procedure of the Edge's "Client Interaction Module" as shown in FIG. 9.

Video Encoder: Its input can be appropriate video frames to be compressed from the "GPU Rendering" module of the Edge. Its output can be a set of compressed video frames using an appropriate encoding.

Video Streaming Module: This component's input can be a set of compressed video frames using an appropriate encoding. Its output can be a video stream appropriate for transport over the network.

Decision Module: This module can accept the following inputs from the "Client Interaction Module" of the Edge device: The first input can be "Current Game World Changes" carried in a data structure from UE, the second input can be "Predicted Game World Changes" carried in a data structure and the third input that can be accepted is the "UE Neural Network Data" which in one embodiment could be a point estimate and in another a probability distribution. The outputs are as follows: The module can forward the "Current Game World Changes" as a data structure carrying status updates to the "GPU Rendering" module or the "Data Aggregation" module; The module can also forward "Predicted Game World Changes" carried in a data structure to the "GPU Rendering" module on the Edge Device. Another output can be the "DNN Data from UE" (which in one embodiment could be a point estimate and in another a probability distribution) to the DNN labelled "Trained Neural Network" in FIG. 9. This same "DNN Data from UE" can also be forwarded to the "MPC Controller" component on the Edge Device as shown in FIG. 9.

In one embodiment, the decision algorithm on the Decision Module selects one out of the following combination of choices: (a) Use low quality video rendering by WTRU's GPU Rendering module+use low quality prediction by WTRU's DNN; (b) Use low quality video rendering by WTRU's GPU Rendering module+use high quality prediction by Edge device's DNN; (c) Use low quality prediction by WTRU's DNN+use high quality video rendering by Edge device's GPU rendering module; (d) Use high quality video rendering by Edge device's GPU rendering module+use high quality prediction by Edge device's DNN. The choice is made in coordination with the Decision Module on the WTRU based on (the basis of) an exchange of telemetry data. In an example, the telemetry data could be the Round-trip time (RTT) between the WTRU and the Edge device.

Data Aggregator: This module can collect current game world changes labelled as "Data for Training" in FIG. 9 and carried in a data structure from the Edge device's "Decision Module". It can use this data to train the DNN labelled "Trained Neural Network" in FIG. 9. In an example, this training is done once a day.

Trained Neural Network: This is a DNN with the following inputs: the first input can be data for training the DNN from the "Data Aggregator" as discussed above. In an example, this training is done once a day. The second input can be "DNN Data from UE" forwarded by the "Decision Module" as shown on FIG. 9. This second input originally coming from the WTRU's smaller DNN in one embodiment could be an approximate point estimate and in another an approximate probability distribution. The output of this DNN is a prediction which in one embodiment could be an accurate point estimate and in another an accurate probability distribution.

Representative Procedures and Mechanisms that are Used to Enable Architectural Components to Deliver Low Latency In various embodiments, procedures and mechanisms are provided with architectural components that may be used to deliver low latency to the cloud gaming application(s). In one embodiment, one or more proposed procedures and mechanisms may run on the WTRU to enable communication with the Edge device. In another embodiment, one or more proposed procedures and mechanisms may run on the Edge device to enable communication with the WTRU. It is also shown, in later description, that how to use these procedures and mechanisms to enable architectural components to deliver low latency. In one embodiment, a protocol packet structure that carries communication data between the WTRU and the Edge is described.

Communication Pattern from a WTRU to an Edge Device

In one embodiment, an WTRU may execute the three procedures named sendGameChanges, sendPredictedGameChanges, sendNeuralNetData to communicate with the remote device on the Edge to facilitate low latency by using predictions from a distributed DNN. In addition, supplementary/helper procedures namely sendAck, getNeuralNetUpdates, and getPredictedAction are also available. Some or all of these procedures are provided by the "Server Interaction Module" on the WTRU (or UE) to other components.

Procedure sendGameChanges. This procedure is provided by the "Server Interaction Module" on the WTRU. It is used by a component on the WTRU to convey to a remote device a change in the game such as an action by the user. In one embodiment, this remote device is an Edge device. The data produced by this procedure is a data structure labelled "Current Game World Changes" and is consumed by various components on the Edge.

Therefore, this procedure may provide key mechanism for sending current game changes to the Edge device to generate high quality images. These images can then be sent back to be rendered on the WTRU. For example, this procedure can be used to implement a policy of low-quality prediction by WTRU's DNN+high quality video rendering by Edge device's GPU rendering module. In addition, this procedure can also be used to implement a policy of high-quality video rendering by Edge device's GPU rendering module+high quality prediction by Edge device's DNN.

This procedure sendGameChanges, requires as a parameter an instance of a class that represents an Edge server. This class provides procedures for programmatically accessing the Internet address and port of an Edge machine. We name this class "EdgeRef" for the purpose of our discussion in this document, but it could be named anything as per the implementation's convenience. The procedure sendGameChanges also requires a parameter that identifies the type of game change. In one embodiment, this type could be represented as an integer. Finally, the procedure sendGameChanges needs the parameters required by type of game action to be also sent. In one embodiment, these parameters could be sent as a byte array. The Server Interaction Module provides to the caller of sendGameChanges procedure a service that marshals arguments into byte arrays and unmarshals the byte array replies back into a suitable data format.

In one embodiment, actions may be required once sendGameChanges executes: sendGameChanges (EdgeRef s, int: Type of game change (e.g., pick item, action), parameters for the game change in a Byte array). Its result is an ACK (acknowledgement) from the Edge device:

Firstly, the Edge device executes getGameChange( ) provided by the Client Interaction Module to acquire the request from the WTRU.

Next, the Edge device executes sendAck(byte[ ] ack, InetAddress UE, int UEPort) provided by the Client Interaction Module. This procedure requires an acknowledgement which in one embodiment could be a byte array. Also needed are classes that return the Internet address of WTRU (in one embodiment this class is called InetAddress). Additionally, the WTRU port is also specified (in one embodiment this port is represented as an integer).

The Edge device selects the type of change and finally executes that type of change as a rendered scene. The rendered game scene is sent as an encoded video by the Edge device to the WTRU. In one embodiment this encoded video could be sent using the Stream Control Transmission Protocol (SCTP) protocol.

Figure 10:
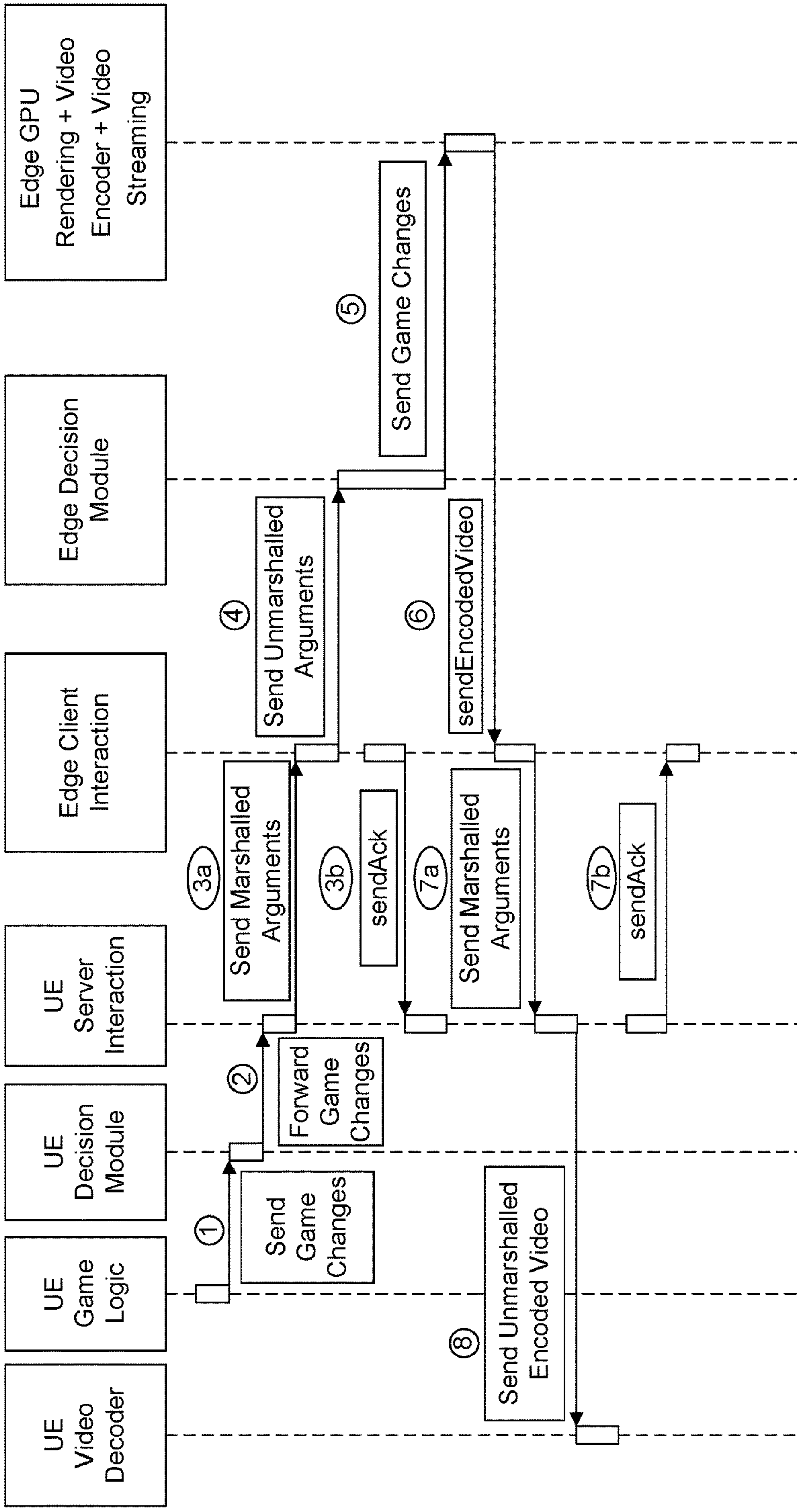
FIG. 10 is a message sequence diagram for a sendGameChanges procedure.

FIG. 10 shows the novel sequence of messages that the system needs to support after the execution of the sendGameChanges procedure. FIG. 10 shows how a proposed procedure can be used to implement a scenario where its output data structure representing current game changes are used by components on the Edge device to generate high quality images. These high-quality images are then sent back to be rendered on the WTRU. As shown in FIG. 10, one or more following steps could be performed:

1. In step 1, the "UE Game Logic" component running on the WTRU sends data structures representing current game changes by calling the procedure sendGameChanges provided by the WTRU's "Server Interaction Module" to the WTRU's "UE Decision Module" component. This step is triggered when the user enacts some action in the game.
2. In step 2, the "UE Decision Module" component running on the WTRU forwards the data structures to the WTRU's "UE Server Interaction" component depending on parameters chosen by a decision policy. In one embodiment of this policy, the step is executed if the RTT value is low or semi-high.
3. Next, in step 3a these data structure arguments are marshaled into byte arrays by the WTRU's "UE Server Interaction" component and sent over the network to the Edge device's "Edge Client Interaction" component.
4. In step 3b of the figure, the "Edge Client Interaction" component sends an acknowledgement back to the client's "UE Server Interaction" component indicating the type of data that it has received.
5. Then in step 4 of the figure, the "Edge Client Interaction" component of the Edge un-marshals the arguments into the appropriate data structures and sends them to the "Edge Decision Module" of the Edge device.
6. In step 5, the "Edge Decision Module" sends the data structures as "Game Changes" to the "Edge GPU Rendering" component running on the Edge depending on parameters chosen by a decision policy. In one embodiment of this policy, the step is executed if the RTT value is low or semi-high. This "Edge GPU Rendering" component then sends a rendered scene to the "Video Encoder" component running on the Edge. The "Video Encoder" in turn sends an encoded video to the "Video Streaming" component. Note that in FIG. 10, the three components namely "GPU Rendering", "Video Encoder", and "Video Streaming" are shown together in one box to save space.
7. This encoded video is forwarded by the "Video Streaming" component to the Edge device's "Edge Client Component" in step 6 as a video stream.
8. In step 7a, the "Edge Client Interaction" component then marshals the video stream and sends it over the network to the WTRU's "UE Server Interaction" component.
9. In step 7b, the WTRU's "UE Server Interaction" component sends an acknowledgement back to the Edge's "Edge Server Interaction" component indicating the type of data that it has received.
10. Finally, in step 8, the "UE Server Interaction" module unmarshalls the arguments it received and sends the resulting encoded video to the WTRU's "UE Video Decoder" component.

Procedure sendPredictedGameChanges. This procedure is provided by the "Server Interaction Module" on the WTRU. It is used by a component on the UE to convey to a remote device a predicted change in the game such as an action by the user. In one embodiment, this remote device is an Edge device. The data produced by this procedure is labelled "Predicted Game World Changes" and is consumed by various components on the Edge. The prediction is done by the local MPC on the UE and so is not as accurate as the prediction made by combining the WTRU's DNN output with the output of the DNN running on the Edge device and feeding that data to the MPC running on the Edge device.

In one embodiment, this procedure is executed when the RTT is low enough for frames to be rendered on the Edge device but not low enough for the Edge device's MPC machinery to contribute to the prediction. In other words, the RTT is semi-high. The precise value of this level of RTT can be determined experimentally for a particular application. Therefore, the procedure enables a saving of time that is spent processing and aggregating data to predict user's actions on the Edge device's MPC machinery at the cost of being not as accurate. For example, this procedure can be used to implement a policy of low-quality prediction by WTRU's DNN+high quality video rendering by Edge device's GPU rendering module.

In one embodiment, the procedure sendPredictedGameChanges, may require as a parameter an instance of a class that represents an Edge server. This class provides procedures for programmatically accessing the Internet address and port of an Edge machine. This class may be named as "EdgeRef", but it could be named something else as per implementation's convenience. The procedure sendPredictedGameChanges may also require a parameter that identifies the type of game change. In one embodiment, this type could be represented as an integer. Finally, the procedure sendPredictedGameChanges needs the parameters required by type of game action to be also sent. In one embodiment, these parameters could be sent as a byte array. The Server Interaction Module provides to the caller of sendPredictedGameChanges procedure a service that marshals arguments into byte arrays and un-marshals the byte array replies back into a suitable data format.

We describe the actions required once sendPredictedGameChanges executes:

sendPredictedGameChanges (EdgeRef s, int: Type of game change (pick item, other action etc), parameters for the game change in a Byte array)

Its result is an ack (acknowledgement) from the Edge device:

Firstly, the Edge device executes getPredictedAction( ) to acquire the request from the UE.

Next, the Edge device asynchronously executes sendAck(byte[ ]ack, InetAddress UE, int UEPort). This procedure requires an acknowledgement which in one embodiment could be a byte array. Also needed are classes that return the Internet address of UE (In one embodiment this class is called InetAddress). Additionally, the UE port is also specified (in one embodiment this port is represented as an integer).

In one embodiment, the decision module of the Edge device accepts the prediction of future game actions for rendering if there is not enough time budget (high RTT) otherwise the prediction is not accepted. If accepted, the prediction is rendered as a game scene This scene is sent as an encoded video by the Edge device to the UE. In one embodiment this encoded video could be sent using the SCTP protocol.

If the prediction is not accepted as there is enough time budget (semi-high RTT), the Edge device further runs the neural net data sent from the UE on its own neural network to refine the prediction (see sendNeuralNetData procedure below). This refined prediction is rendered as a game scene. This scene is sent as an encoded video by the Edge device to the UE. In one embodiment this encoded video could be sent using the SCTP protocol.

Figure 11:
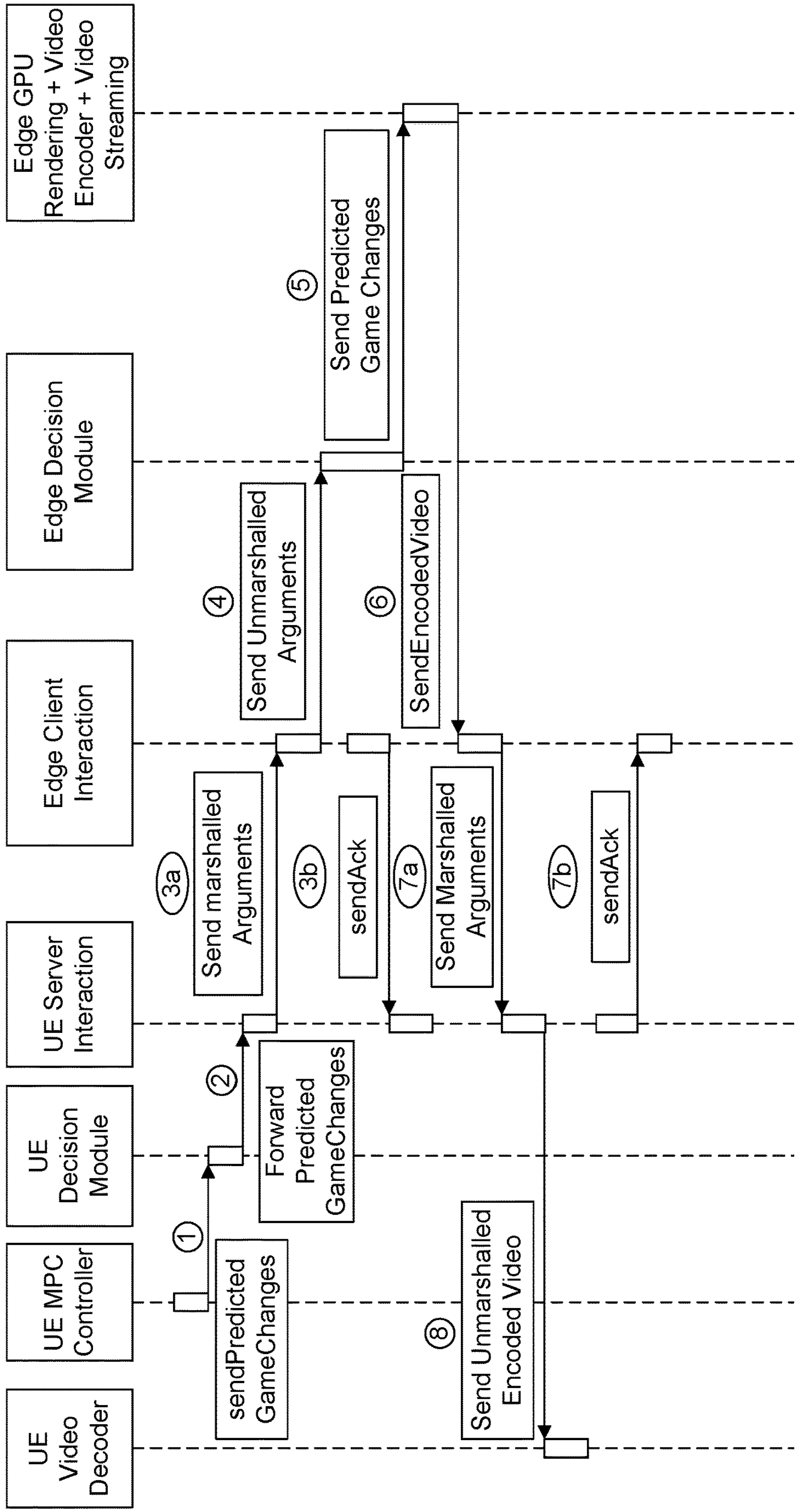
FIG. 11 is a message sequence diagram for a sendPredictedGameChanges procedure.

FIG. 11 shows the sequence of messages that the system needs to support after the execution of the sendPredictedGameChanges procedure. FIG. 11 shows how a proposed procedure can be used to implement a scenario where low-quality (approximate) prediction of WTRU's DNN is combined with a high-quality video rendering of the predictions on the Edge device.

As shown in FIG. 11, one or more following steps could be performed:

1. In step 1, the "UE MPC Controller" component running on the UE sends a data structure containing predicted game world changes to the UE's "UE Decision Module" component. This step is triggered when the user enacts some action in the game.
2. In step 2, the "UE Decision Module" component running on the UE forwards the data structures to the UE's "UE Server Interaction" component by calling its procedure sendPredictedGameChanges depending on parameters chosen by a decision policy. In one embodiment of this policy, the step is executed if the RTT value is semi-high.
3. Next, in step 3a these data structure arguments are marshaled into byte arrays by the UE's "UE Server Interaction" component and sent over the network to the Edge device's "Edge Client Interaction" component.
4. In step 3b of the figure, the "Edge Client Interaction" component sends an acknowledgement back to the client's "UE Server Interaction" component indicating the type of data that it has received.
5. Then in step 4 of the figure, the "Edge Client Interaction" component of the Edge un-marshals the arguments into the appropriate data structures and sends them to the "Edge Decision Module" of the Edge device.
6. In step 5, the "Edge Decision Module" sends the data structures as "Predicted Game Changes" to the "Edge GPU rendering" component running on the Edge depending on parameters chosen by a decision policy. In one embodiment of this policy, the step is executed if the RTT value is semi-high. This "Edge GPU Rendering" component then sends a rendered scene to the "Video Encoder" component running on the Edge. The "Video Encoder" in turn sends an encoded video to the "Video Streaming" component. Note that in FIG. 11, the three components namely "GPU Rendering", "Video Encoder", and "Video Streaming" are shown together in one box to save space.
7. This encoded video is forwarded by the "Video Streaming" component to the Edge device's "Edge Client Component" in step 6.
8. In step 7a, the "Edge Client Interaction" component then marshals the video stream and sends it over the network to the UE's "UE Server Interaction" component.
9. In step 7b, the UE's "UE Server Interaction" component sends an acknowledgement back to the Edge's "Edge Server Interaction" component indicating the type of data that it has received.
10. Finally, in step 8, the "UE Server Interaction" module unmarshalls the arguments it received and sends the resulting encoded video to the UE's "UE Video Decoder" component.

Procedure sendNeuralNetData. This procedure is provided by the "Server Interaction Module" on the WTRU. It is used by the DNN labelled "Trained Neural Network" in FIG. 8 on the WTRU to convey to a remote device an early exit data from the local DNN on the WTRU. In one embodiment, this remote device is an Edge device. The data produced by this procedure is labelled "UE Neural Network Data" and is consumed by various components on the Edge.

The procedure's output is a prediction of the future state of the game. In one embodiment, the predictions are in the form of a point estimate. In another embodiment, the predictions are in the form of a probability distribution.

The prediction is done on the local DNN on the WTRU and so is not as accurate as the prediction made by combining the UE's DNN output with the DNN running on the Edge device. In one embodiment, this procedure is executed when the RTT is low enough so that we have enough time-budget to combine the WTRU DNN's output with the Edge device's DNN output and render the predictions as frames on the Edge device.

Therefore, this procedure provides mechanism (e.g., key mechanism) for generating predictions by a distributed DNN between the UE and the Edge device using in-situ data. For example, this procedure can be used to implement a policy of high-quality video rendering by Edge device's GPU rendering module+high quality prediction by Edge device's DNN.

The procedure sendNeuralNetData may require as a parameter an instance of a class that represents an Edge server. This class provides procedures for programmatically accessing the Internet address and port of an Edge machine. Naming this class "EdgeRef" as an example, but it could be named anything as per the implementation's convenience. The procedure sendNeuralNetData also requires a parameter that identifies the type of neural network data that is being sent (e.g. point estimate vs probability distribution). In one embodiment, this type could be represented as an integer. Finally, the procedure sendNeuralNetData needs the parameters required by type of neural network to be also sent. In one embodiment, these parameters could be sent as a byte array. The Server Interaction Module provides to the send- NeuralNetData procedure a service that marshals arguments into byte arrays and un-marshals the byte array replies back into a suitable data format.

We describe the actions required once sendNeuralNetData executes:

sendNeuralNetData (EdgeRef s, int: Type of neural net data (e.g. point estimate vs. probability distribution), parameters for the neural net data in a Byte array)

Its result is an ACK (acknowledgement) from the Edge device:

Firstly, the Edge device executes getUENeuralNetData( ) to acquire the request from the UE.

Next, the Edge device asynchronously executes sendAck(byte[ ]ack, InetAddress UE, int UEPort). This procedure requires an acknowledgement which in one embodiment could be a byte array. Also needed are classes that return the Internet address of UE (In one embodiment this class is called InetAddress). Additionally, the UE port is also specified (in one embodiment this port is represented as an integer).

Finally, asynchronously the Edge device sends the data to its neural network for further refinement and a more accurate prediction. In one embodiment, this prediction is only used if we have enough time (low RTT) else it is used for training.

Figure 12:
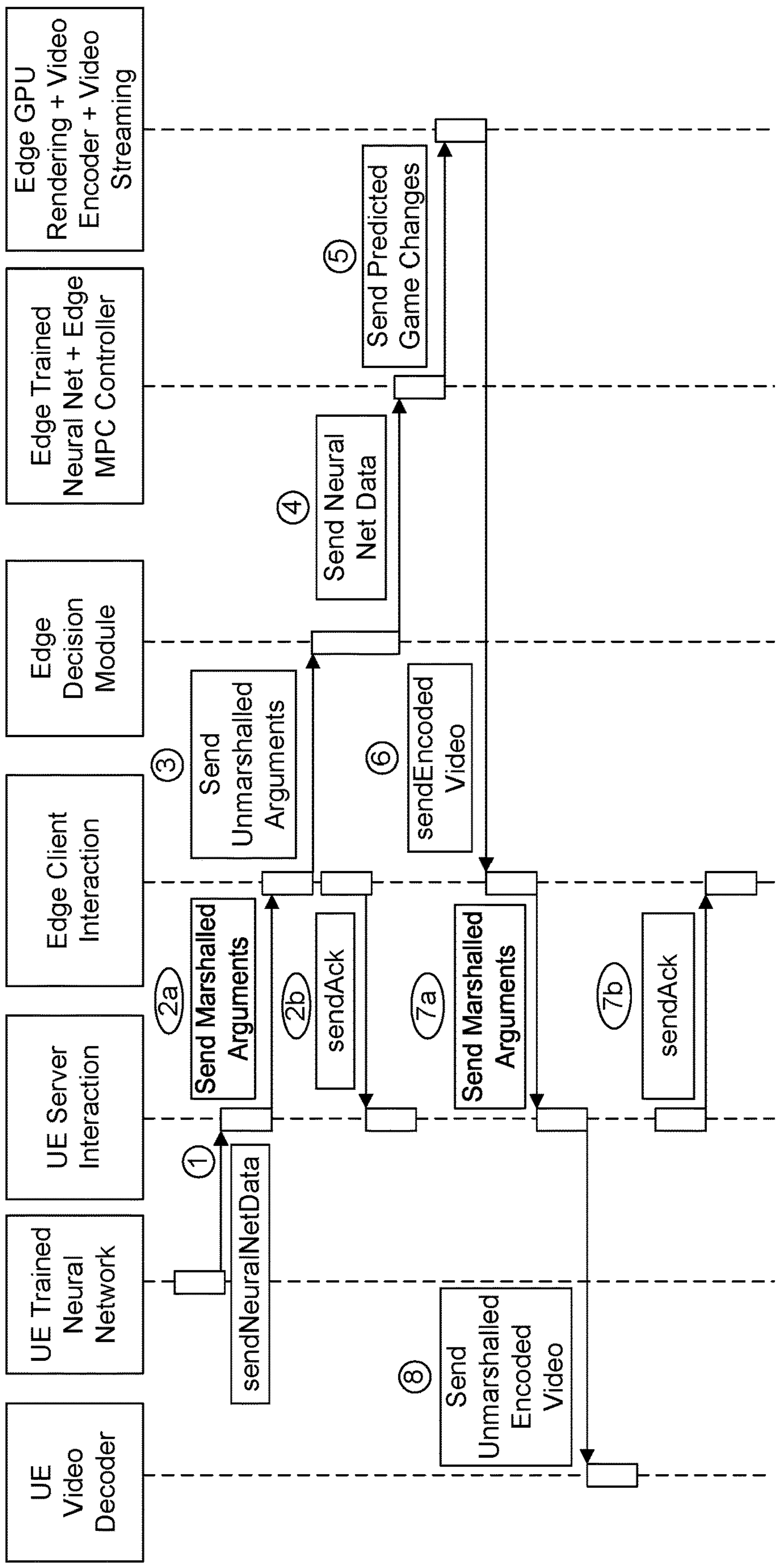
FIG. 12 is a message sequence diagram for a sendNeuralNetData procedure.

FIG. 12 shows the sequence of messages that the system needs to support after the execution of the sendNeuralNetData procedure. FIG. 12 shows how a proposed procedure can be used to implement a scenario where the WTRU DNN's output is combined with the Edge device's DNN output and the resulting high-quality predictions are then rendered as high quality video frames on the Edge device's "GPU Renderer" component.

As shown in FIG. 12, one or more following steps could be performed:

1. In step 1, the "UE Trained Neural Network" component running on the UE sends the DNN output in the form of data structures to "UE Server Interaction" component by calling the procedure sendNeuralNetData provided by the "UE Server Interaction". This step is triggered when the user enacts some action in the game.
2. Next, in step 2a these data structure arguments are marshaled into byte arrays by the UE's "UE Server Interaction" component and sent over the network to the Edge device's "Edge Client Interaction" component.
3. In step 2b of the figure, the "Edge Client Interaction" component sends an acknowledgement back to the client's "UE Server Interaction" component indicating the type of data that it has received.
4. Then in step 3 of the figure, the "Edge Client Interaction" component of the Edge un-marshals the arguments into the appropriate data structures and sends them to the "Edge Decision Module" of the Edge device.
5. In step 4, the "Edge Decision Module" sends the data structures as "Neural Net Data" to the "Edge Trained Neural Network" for more accurate predictions depending on parameters chosen by a decision policy. In one embodiment of this policy, the step is executed if the RTT value is low. This data is then sent by the "Edge Trained Neural Network" in an appropriate form to the "Edge MPC Controller" for prediction. Note that in FIG. 12, the two components namely "Edge Trained Neural Network", and "Edge MPC Controller" are shown together in one box to save space.
6. Next in step 5, the data structure "Predicted Game Changes" from the "MPC Controller" component is sent to the "Edge GPU Rendering" component running on the Edge. This "Edge GPU Rendering" component then sends a rendered scene to the "Video Encoder" component running on the Edge. The "Video Encoder" in turn sends an encoded video to the "Video Streaming" component. Note that in FIG. 12, the three components namely "GPU Rendering", "Video Encoder", and "Video Streaming" are shown together in one box to save space.
7. This encoded video is forwarded by the "Video Streaming" component to the Edge device's "Edge Client Component" in step 6.
8. In step 7a, the "Edge Client Interaction" component then marshals the video stream and sends it over the network to the UE's "UE Server Interaction" component.
9. In step 7b, the UE's "UE Server Interaction" component sends an acknowledgement back to the Edge's "Edge Server Interaction" component indicating the type of data that it has received.
10. Finally, in step 8, the "UE Server Interaction" module unmarshalls the arguments it received and sends the resulting encoded video to the UE's "UE Video Decoder" component.

Communication Pattern from the Edge Device to the WTRU

In one embodiment, the Edge device sends the three types of acknowledgement encapsulated in the procedure sendAck in response to the three procedure calls of the WTRU namely sendGameChanges, sendPredictedGameChanges, sendNeuralNetData. In addition, the Edge device executes respectively getGameChanges, getPredictedChange, and getUENeuralNetData in response to the aforementioned procedures of WTRU. These procedures namely sendAck, getGameChanges, getPredictedChange, getUENeuralNetData, are provided by the Edge's "Client Interaction Module" to components running on the Edge device. In addition, the module provides procedures sendNeuralNetUpdates, and sendPredictedGameChanges which are being discuss herein.

Procedure sendNeuralNetUpdates. The procedure on the Edge device called sendNeuralNetUpdates, is used by the MPC Controller on the Edge to update the numerical values of the parameters of the MPC Controller running on the UE. Therefore, this procedure provides a key mechanism for updating numerical parameters for a distributed MPC between the UE and the Edge device that is used for in-situ prediction. This procedure may require as a parameter an instance of a class that represents a UE. This class provides procedures for programmatically accessing the Internet address and port of a UE. We name this class "UERef" for the purpose of our discussion in this document, but it could be named anything as per the implementation's convenience. The procedure sendNeuralNetUpdates may also require a parameter that identifies the type of control algorithm variables that are being updated. In one embodiment, this type could be represented as an integer. Finally, the procedure sendNeuralNetUpdates may need the parameters required by type of neural network to be also sent. In one embodiment, these parameters could be sent as a byte array.

The "Client Interaction Module" on the Edge device provides to the callers of the sendNeuralNetUpdates procedure a service that marshals arguments into byte arrays and un-marshals the byte array replies back into a suitable data format.

We describe the actions required once sendNeuralNetUpdates executes:

sendNeuralNetUpdates (UERef s, Byte array with the data, e.g., point estimate or probability distribution))

Its result is an ACK (acknowledgement) from the WTRU:

Firstly, the UE executes getNeuralNetUpdate( ) provided by the "Server Interaction Module" to acquire the request from the Edge.

Next, the UE executes sendAck(byte[ ] ack, InetAddress edgeDevice, int edgeDevicePort) provided by the "Server Interaction Module". This procedure requires an acknowledgement which in one embodiment could be a byte array. Also needed are classes that return the Internet address of Edge device (In one embodiment this class is called InetAddress). Additionally, the Edge device port is also specified (in one embodiment this port is represented as an integer).

As discussed above, the Edge may send encoded video using SCTP protocol in one embodiment. Additionally, the Edge device may send the three types of ACK in response to the three procedure calls from the WTRU namely sendGameChanges, sendPredictedGameChanges, sendNeuralNetData.

Figure 13:
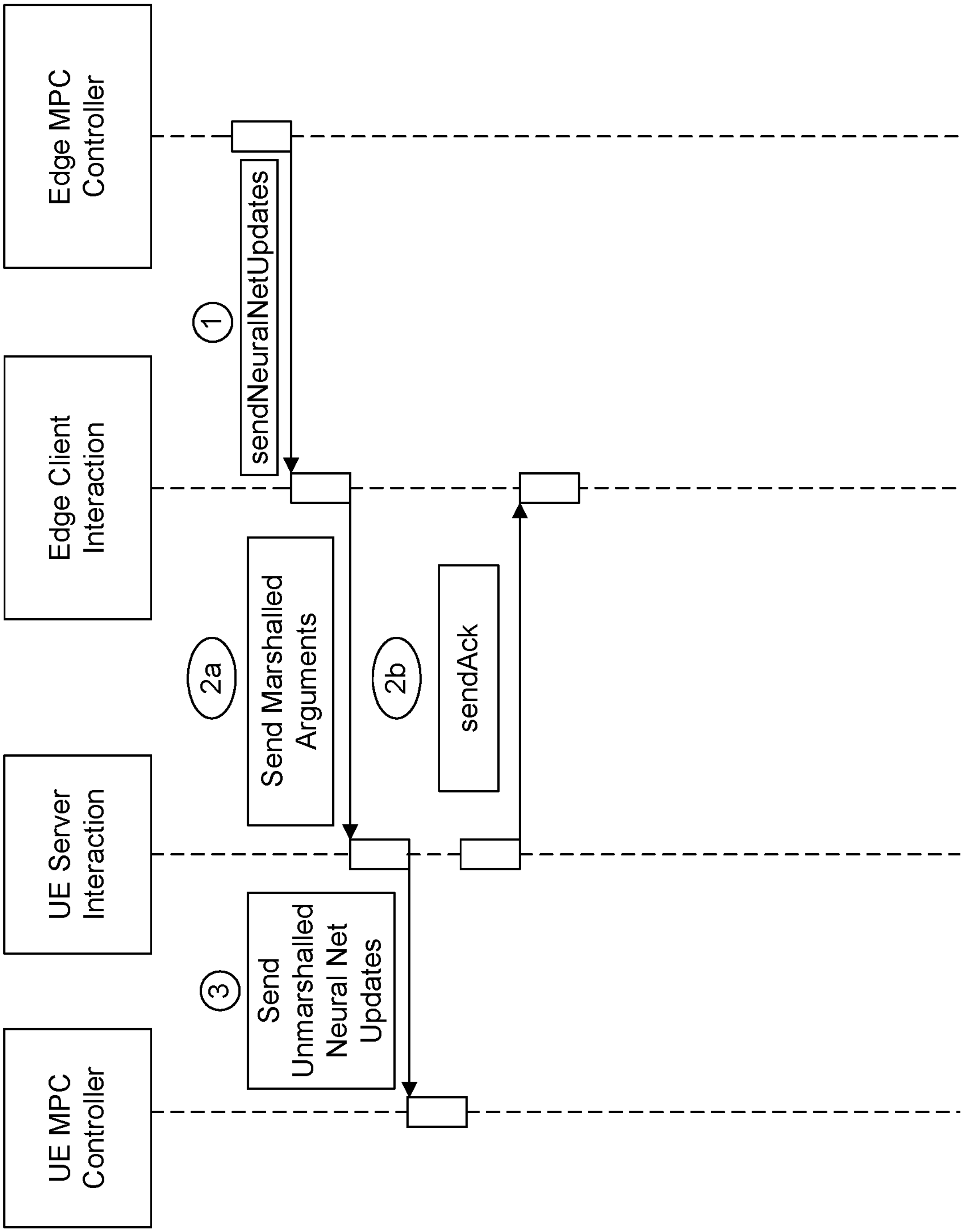
FIG. 13 is a message sequence diagram for a sendNeuralNetUpdates procedure.

FIG. 13 shows the sequence of messages that the system needs to support after the execution of the sendNeuralNetUpdates procedure. FIG. 13 shows how a proposed procedure can be used to implement a key mechanism for updating numerical parameters for a distributed MPC between the WTRU and the Edge device that is used for in-situ prediction.

As shown in FIG. 13, one or more following steps could be performed:

In step 1, the "Edge MPC Controller" component sends data structure containing numerical values of the parameters for the UE's "MPC Controller" by making a call to the "Edge Client Interaction" Module's sendNeuralNetUpdates procedure. In one embodiment, this step is triggered once a day.

In step 2a, the "Edge Client Interaction" component marshals the data structures and sends it over the network to the UE's "UE Server Interaction" component.

In step 2b, the UE's "UE Server Interaction" component sends an acknowledgement back to the Edge's "Edge Server Interaction" component indicating the type of data that it has received.

Finally, in step 3, the "UE Server Interaction" module unmarshalls the arguments it received and sends the resulting "Neural Net Updates" to the UE's "UE MPC Controller" component.

Procedure sendPredictedGameChanges

The procedure sendPredictedGameChanges is provided by the Edge's "Client Interaction Module". It is used by the "MPC Controller" component on the Edge device to send "Predicted Game World Changes" in a data structure to be directly rendered by the UE's "GPU Renderer" component. Therefore, the procedure enables a high-quality prediction on the Edge device to be rendered as a low-quality video on the UE thereby saving the extra time it would take for video rendering on the Edge.

This procedure may require as a parameter an instance of a class that represents a UE. This class provides procedures for programmatically accessing the Internet address and port of a UE. We name this class "UERef" for the purpose of our discussion in this document, but it could be named anything as per the implementation's convenience. The procedure sendPredictedGameChanges may also require a parameter that identifies the type of game change. In one embodiment, this type could be represented as an integer. Finally, the procedure sendPredictedGameChanges needs the parameters required by type of game action to be also sent. In one embodiment, these parameters could be sent as a byte array.

The Client Interaction Module provides to the caller of sendPredictedGameChanges procedure a service that marshals arguments into byte arrays and un-marshals the byte array replies back into a suitable data format.

We describe the actions required once sendPredictedGameChanges executes:

sendPredictedGameChanges (UERef s, int: Type of game change (pick item, other action etc), parameters for the game change in a Byte array)

Its result is an ACK (acknowledgement) from the WTRU:

Firstly, the UE executes getPredictedAction( ) provided by the "Server Interaction Module" to acquire the request from the WTRU.

Next the UE executes sendAck(byte[ ] ack, InetAddress edgeDevice, int edgeDevicePort) provided by the "Server Interaction Module". This procedure requires an acknowledgement which in one embodiment could be a byte array. Also needed are classes that return the Internet address of Edge device (In one embodiment this class is called InetAddress). Additionally, the Edge device port is also specified (in one embodiment this port is represented as an integer).

Figure 14:
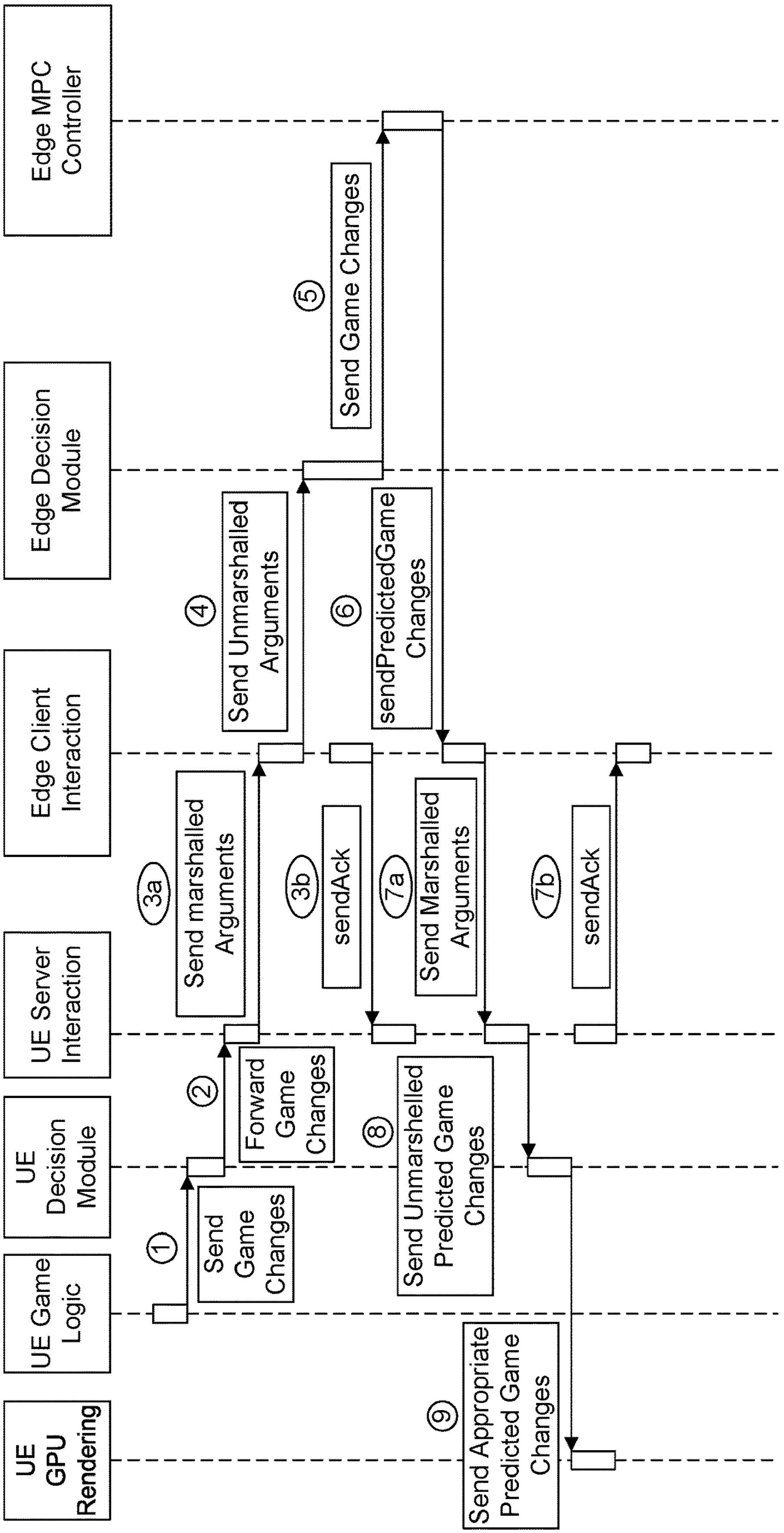
FIG. 14 is a message sequence diagram for a sendPredictedGameChanges procedure.

FIG. 14 shows the sequence of messages that the system needs to support before and after the execution of the sendPredictedGameChanges procedure. FIG. 14 shows how a proposed procedure can be used to implement a high-quality prediction on the Edge device that can then be rendered as a low-quality video on the WTRU thereby saving the extra time it would take for video rendering on the Edge.

As shown in FIG. 14, one or more following steps could be performed:

1. In step 1, the "UE Game Logic" component running on the UE sends data structures representing current game changes by calling the procedure sendGameChanges provided by the UE's "Server Interaction Module" to the UE's "UE Decision Module" component. This step is triggered when the user enacts some action in the game.
2. In step 2, the "UE Decision Module" component running on the UE forwards the data structures to the UE's "UE Server Interaction" component depending on parameters chosen by a decision policy. In one embodiment of this policy, the step is executed if the RTT value is semi-high.
3. Next, in step 3a these data structure arguments are marshaled into byte arrays by the UE's "UE Server Interaction" component and sent over the network to the Edge device's "Edge Client Interaction" component.
4. In step 3b of the figure, the "Edge Client Interaction" component sends an acknowledgement back to the client's "UE Server Interaction" component indicating the type of data that it has received.
5. Then in step 4 of the figure, the "Edge Client Interaction" component of the Edge un-marshals the arguments into the appropriate data structures and sends them to the "Edge Decision Module" of the Edge device.

6. In step 5, the "Edge Decision Module" sends the data structures as "Game Changes" to the "Edge MPC Controller" component running on the Edge depending on parameters chosen by a decision policy. In one embodiment of this policy, the step is executed if the RTT value is semi-high.
7. In step 6, the "Edge MPC Controller" sends a data structures containing predicted game changes by making a call to the procedure sendPredictedGameChanges provided by the Edge's "Edge Client Interaction" component.
8. In step 7a, the "Edge Client Interaction" component marshals the data structures and sends it over the network to the UE's "UE Server Interaction" component.
9. In step 7b, the UE's "UE Server Interaction" component sends an acknowledgement back to the Edge's "Edge Server Interaction" component indicating the type of data that it has received.
10. Next, in step 8, the "UE Server Interaction" module unmarshalls the arguments it received and sends the resulting "Predicted Game Changes" to the UE's "UE Decision Module" component.
11. Finally, in step 9, the "UE Decision Module" sends an appropriate "Predicted Game World Change" to be rendered on the UE by the "UE GPU Rendering".

Figure 15:
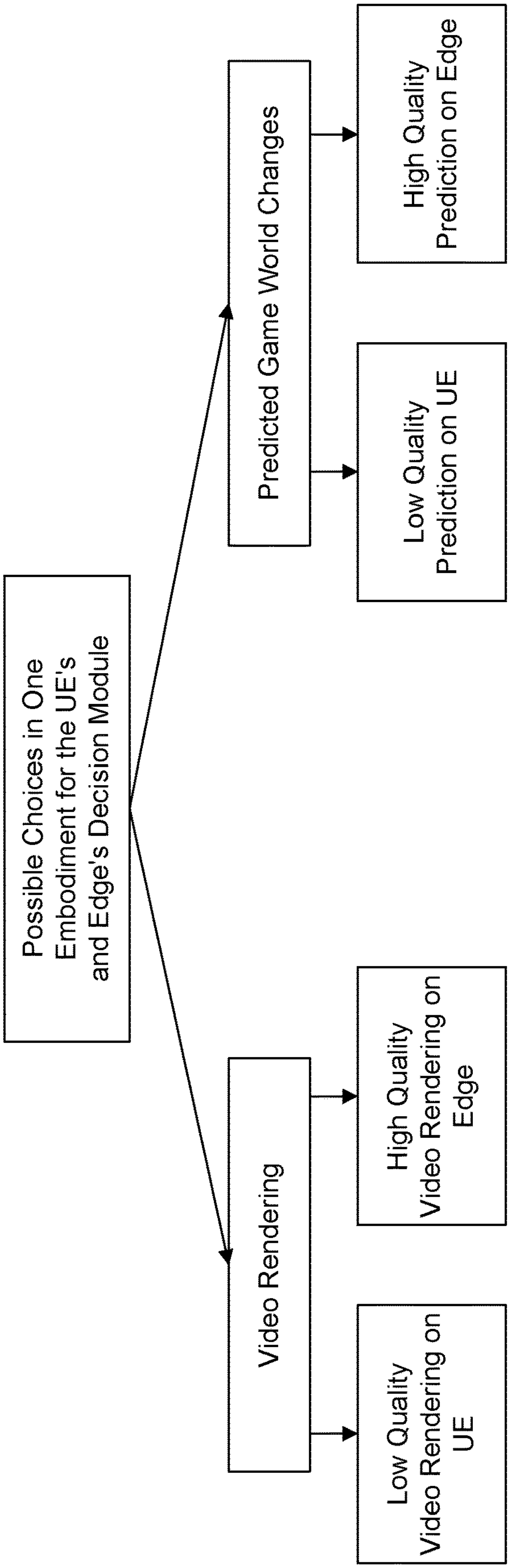
FIG. 15 illustrates example procedures and mechanisms to enable the architectural components to deliver low latency.

Representative Example(s) of how to Use the Described Procedures and Mechanisms Herein to Enable the Architectural Components to Deliver Low Latency As discussed above, in various embodiments, the decision algorithm on the Decision Module on the WTRU selects one out of the following combination of choices as a strategy to achieve low latency: (a) Use low quality video rendering by UE's GPU Rendering module+use low quality prediction by UE's DNN; (b) Use low quality video rendering by UE's GPU Rendering module+use high quality prediction by Edge device's DNN; (c) Use low quality prediction by UE's DNN+use high quality video rendering by Edge device's GPU rendering module; (d) Use high quality video rendering by Edge device's GPU rendering module+use high quality prediction by Edge device's DNN. These set of choices can be obtained from FIG. 15.

In one embodiment, the choice could be made by the "Decision Module" of WTRU or UE in coordination with the Decision Module on the Edge device on the basis of an exchange of telemetry data. In one embodiment, the telemetry data could be the Round-trip time (RTT) between the UE and the Edge device.

In various embodiments, the components, procedures, and/or mechanisms discussed above can be used to achieve low latency herein in view of the embodiment(s) of the decision algorithm. These novel components, procedures and mechanisms are general and can support any decision algorithm beyond the embodiments discussed herein.

Use Low Quality Video Rendering by UE's GPU Rendering Module+Use Low Quality Prediction by UE's DNN This choice is made by using telemetry data which in one embodiment could be the Round-Trip Time (RTT) between the UE and the Edge device. In such an embodiment, a high RTT will mean that we do not have enough time budget to render a video on the Edge device or to use the prediction of the "MPC Controller" on the Edge device. Therefore, the "Decision Module" on the UE chooses to rely on the "GPU Renderer" on UE for video rendering and on "MPC Controller" on the UE for an approximate prediction. The precise value of this RTT will need to be determined experimentally for a specific application.

Figure 16:
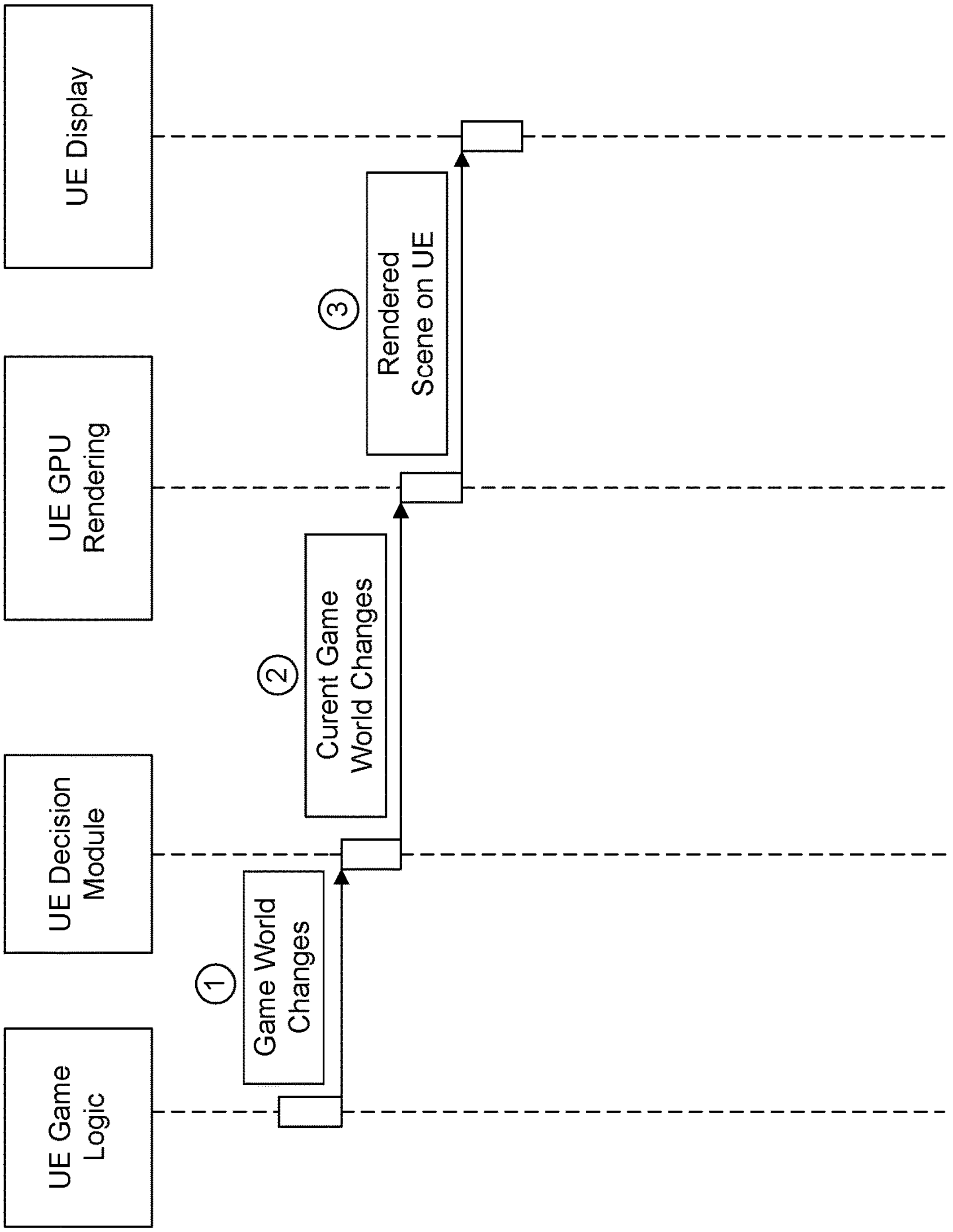
FIG. 16 is a message sequence diagram for implementing low-quality video rendering by WTRU's GPU Rendering Module of current game world changes.
Figure 17:
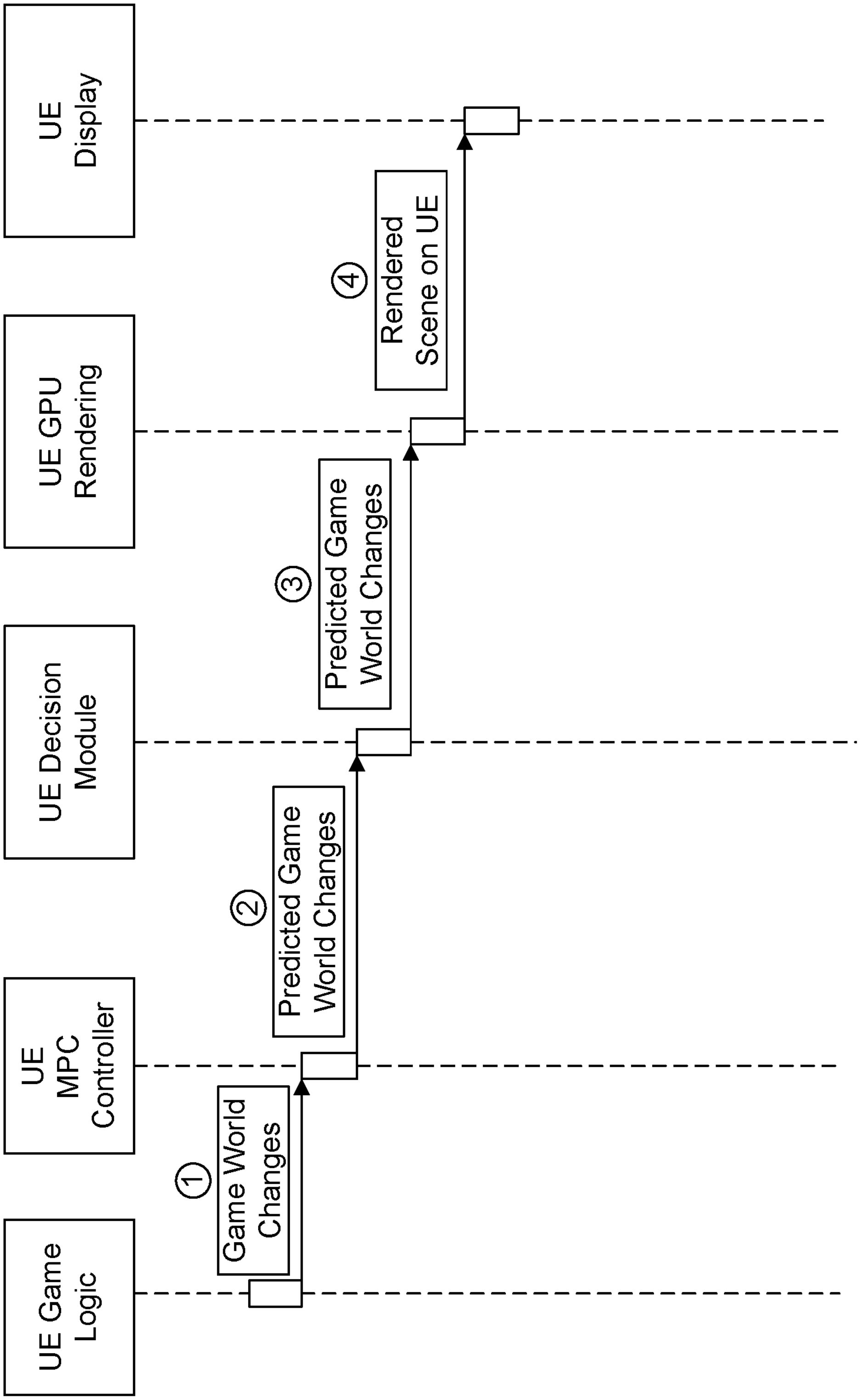
FIG. 17 is a message sequence diagram for implementing low-quality video rendering by WTRU's GPU Rendering Module+Use low quality prediction by WTRU's DNN.

This choice can be achieved by a combination of the message sequences depicted in FIG. 16 and/or FIG. 17. In one embodiment, FIG. 16 shows how a "Current Game World Change" can be rendered on the UE. On the other hand, FIG. 17 shows how a prediction from the UE's MPC Controller in the form of "Predicted Game World Changes" can be rendered on the UE. In these examples/embodiments, we assume that the action in the game is fast paced and that along with the "Current Game World Changes", we need to speculatively cache a small number of "Predicted Game World Changes" generated locally on the UE. In addition, we assume that the implementation of the UE's "Decision Module" has ways to pick and choose from among the current and predicted game world changes. Note that to implement this choice, no messages are sent to the Edge device. The message sequence diagrams in FIG. 16 and FIG. 17 are described below in details.

FIG. 16 shows steps needed to render "Game World Changes" locally on the UE. These steps show how "UE Decision Module" component running on the UE saves time to achieve low-latency by allowing a low-quality video rendering of actual game changes on the UE itself. In step 1, the "Game Logic" component on the UE sends a data structure containing the "Game World Changes" to the "Decision Module" on the UE. This step is triggered when the user enacts some action in the game. Next, in step 2, the "Decision Module" on the UE forwards the "Current Game World Changes" to the UE's "GPU Rendering" module depending on parameters chosen by a decision policy. In one embodiment of this policy, the step is executed if the RTT value is high. The UE's "GPU Rendering" module then renders the scene and sends it for display to the "UE Display" in step 3.

FIG. 17 shows steps required to render low quality prediction on UE itself. These steps show how the "UE Decision Module" component running on the UE saves time to achieve low-latency by allowing a low-quality prediction of future game changes from "UE MPC Controller" to be rendered as a low-quality video on the UE itself. In step 1, the "Game Logic" component on the UE sends a data structure containing the "Game World Changes" to the "MPC Controller" on the UE. The "MPC Controller" requires this data structure to make predictions about game world changes. This step is triggered when the user enacts some action in the game. Next, in step 2, the UE's "MPC Controller" component generates a data structure with the "Predicted Game World Changes" and sends it to UE's "Decision Module". In step 3, the "Decision Module" on the UE forwards the appropriate "Predicted Game World Changes" to the UE's "GPU Rendering" module depending on parameters chosen by a decision policy. In one embodiment of this policy, the step is executed if the RTT value is high. Finally, the UE's "GPU Rendering" module sends the rendered scene for display to the "UE Display" in step 4.

Use Low Quality Video Rendering by UE's GPU Rendering Module+Use High Quality Prediction by Edge Device's DNN This choice is made by using telemetry data which in one embodiment could be the Round-Trip Time (RTT) between the UE and the Edge device. In such an embodiment, a semi-high RTT will mean that we do not have enough time budget to both render a video and make a prediction on the Edge device but can use just the prediction of the MPC controller on the Edge device. So, the "Decision Module" on the UE chooses to rely on the "GPU Renderer" on UE for video rendering and on "MPC Controller" on the Edge for an accurate prediction. The precise value of this semi-high RTT will need to be determined experimentally for a specific application.

This choice may be achieved by a combination of the novel message sequences depicted in FIG. 16 and FIG. 14. In one embodiment, FIG. 16 shows how a "Current Game World Change" can be rendered on the UE. On the other hand, FIG. 14 shows how a prediction from the Edge's MPC Controller in the form of "Predicted Game World Changes" can be rendered through the UE's Decision module.

In this embodiment, we assume that the action in the game is fast paced and that along with the "Current Game World Changes", we need to speculatively cache a small number of "Predicted Game World Changes" generated remotely on the Edge. In addition, we assume that the implementation of the UE's and Edge's "Decision Module" has ways to pick and choose from among the current and predicted game world changes. Note that to implement this choice, messages are sent to the Edge device from the UE.

Use Low Quality Prediction by UE's DNN+Use High Quality Video Rendering by Edge Device's GPU Rendering Module This choice is made by using telemetry data which in one embodiment could be the Round-Trip Time (RTT) between the UE and the Edge device. In one embodiment, a semi-high RTT will mean that we do not have enough time budget for a prediction on the Edge device (and so will have to use the UE's "MPC Controller" for an approximate prediction) but can still use the "GPU Renderer" on the Edge device for high-quality video rendering. So, the "Decision Module" on the UE chooses to rely on the "MPC Controller" on UE for an approximate prediction and on "GPU Renderer" on the Edge for high-quality video rendering. The precise value of this semi-high RTT will need to be determined experimentally for a specific application.

This choice may be achieved by a combination of the message sequences depicted in FIG. 10 and FIG. 11. FIG. 10 shows how a "Current Game World Change" from UE can be rendered on the Edge. Similarly, FIG. 11 shows how a prediction from the UE's MPC Controller in the form of "Predicted Game World Changes" can be rendered on the Edge.

In this embodiment, we assume that the action in the game is fast paced and that along with the "Current Game World Changes", we need to speculatively cache a small number of "Predicted Game World Changes" generated on the UE. In addition, we assume that the implementation of the UE's and Edge's "Decision Module" has ways to pick and choose from among the current and predicted game world changes. Note that to implement this choice, messages are sent to the Edge device from the UE.

Use High Quality Video Rendering by Edge Device's GPU Rendering Module+Use High Quality Prediction by Edge Device's DNN This choice is made by using telemetry data which in one embodiment could be the Round-Trip Time (RTT) between the UE and the Edge device. In such an embodiment, a low RTT will mean that we have enough time budget for a prediction on the Edge device and can also use the "GPU Renderer" on the Edge device for high-quality video rendering. So, the "Decision Module" on the UE chooses to rely on the "MPC Controller" on Edge for an accurate prediction and on "GPU Renderer" on the Edge for high-quality video rendering. The precise value of this low RTT will need to be determined experimentally for a specific application.

This choice may be achieved by a combination of the novel message sequences depicted in FI>10 and FIG. 12. FIG. 10 shows how a "Current Game World Change" from UE can be rendered as a high-quality video on the Edge. Similarly, FIG. 12 shows the scenario where a low-quality prediction from UE's DNN is combined with a high-quality prediction from the Edge device's DNN and the prediction rendered as a high-quality video by the "GPU Renderer" component on the Edge device.

In this embodiment, we assume that the action in the game is fast paced and that along with the "Current Game World Changes", we need to speculatively cache a small number of "Predicted Game World Changes" generated on the Edge. In addition, we assume that the implementation of the UE's and Edge's "Decision Module" has ways to pick and choose from among the current and predicted game world changes. Note that to implement this choice, messages are sent to the Edge device from the UE.

Representative Protocol Packet Structure(s)

Figure 18:
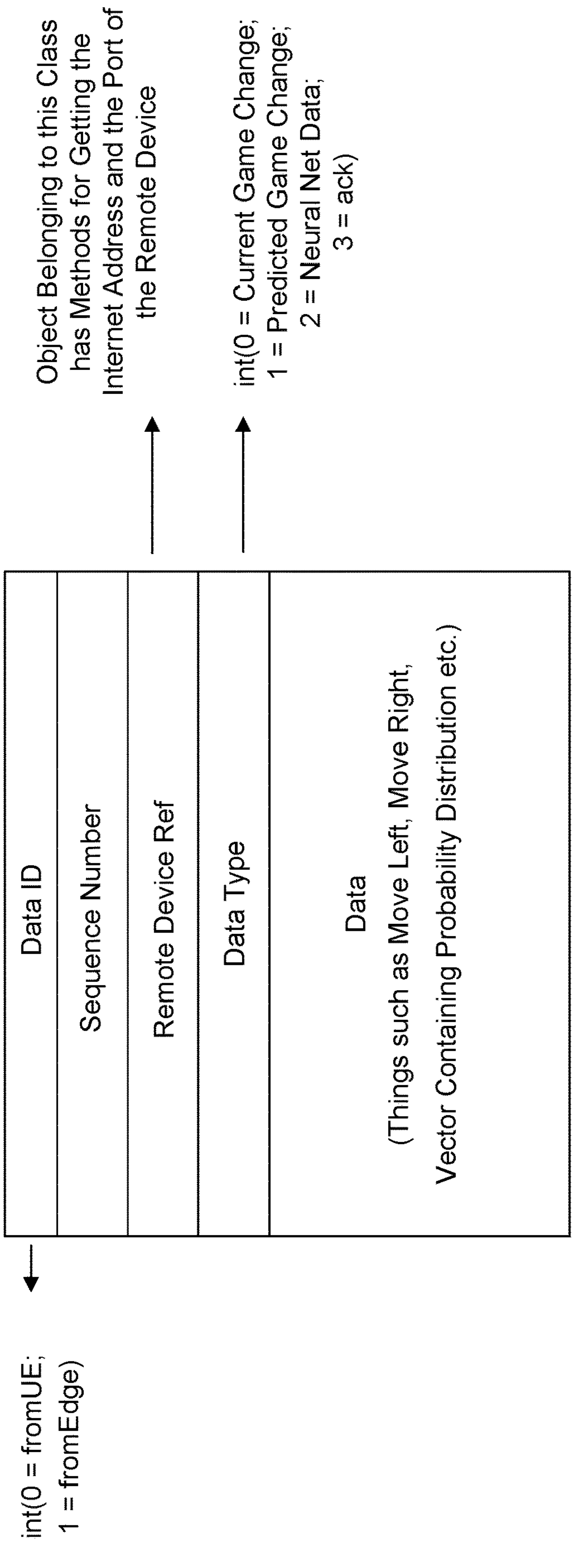
FIG. 18 is an example packet structure for communication between WTRU(s) and Edge device(s)

The packet structure for the communication between the UE and the Edge is shown in FIG. 18. The first field labelled "Data ID" is used to indicate if the packet is being sent from UE or the Edge. The field labelled "Sequence Number" indicates the identifier of the message. The field labelled "Remote Device ref" is an instance belonging to the class RemoteDevice. An object belonging to this class has methods that return the internet address and port of the remote device such as an Edge device. The field labelled "Data Type" indicates the type of data being carried by the packet. In one embodiment, it is an integer value with "0" representing current game change; "1" representing predicted game change; "2" representing neural network data; and "3" representing an acknowledgement. The data carried by the packet for example could be the game actions such as "move left", "move right", or a vector containing a probability distribution.

Figure 19:
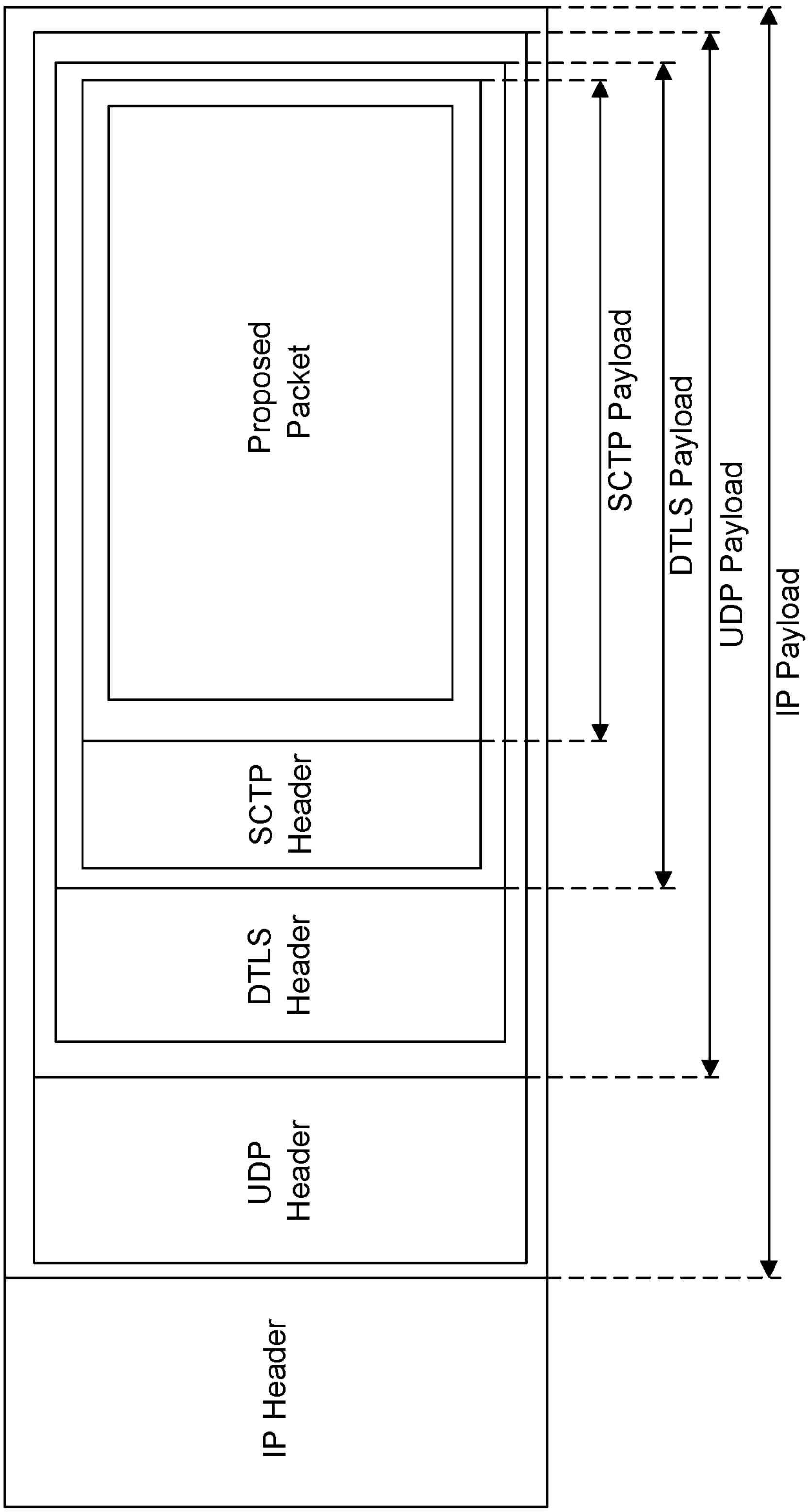
FIG. 19 is a diagram illustrating example position(s) of proposed packet(s) in protocol layers of a WebRTC data channel.

Referring to FIG. 19, one embodiment is shown where a proposed packet is nested in the WebRTC protocol stack as a payload of the SCTP packet. The SCTP packet itself is carried over the Datagram Transport Layer Security (DTLS) protocol packet. This DTLS payload is in turn carried over UDP packet. In an example, the UDP packet is carried as a payload over an IP packet.

3GPP Embodiments

Figure 20:
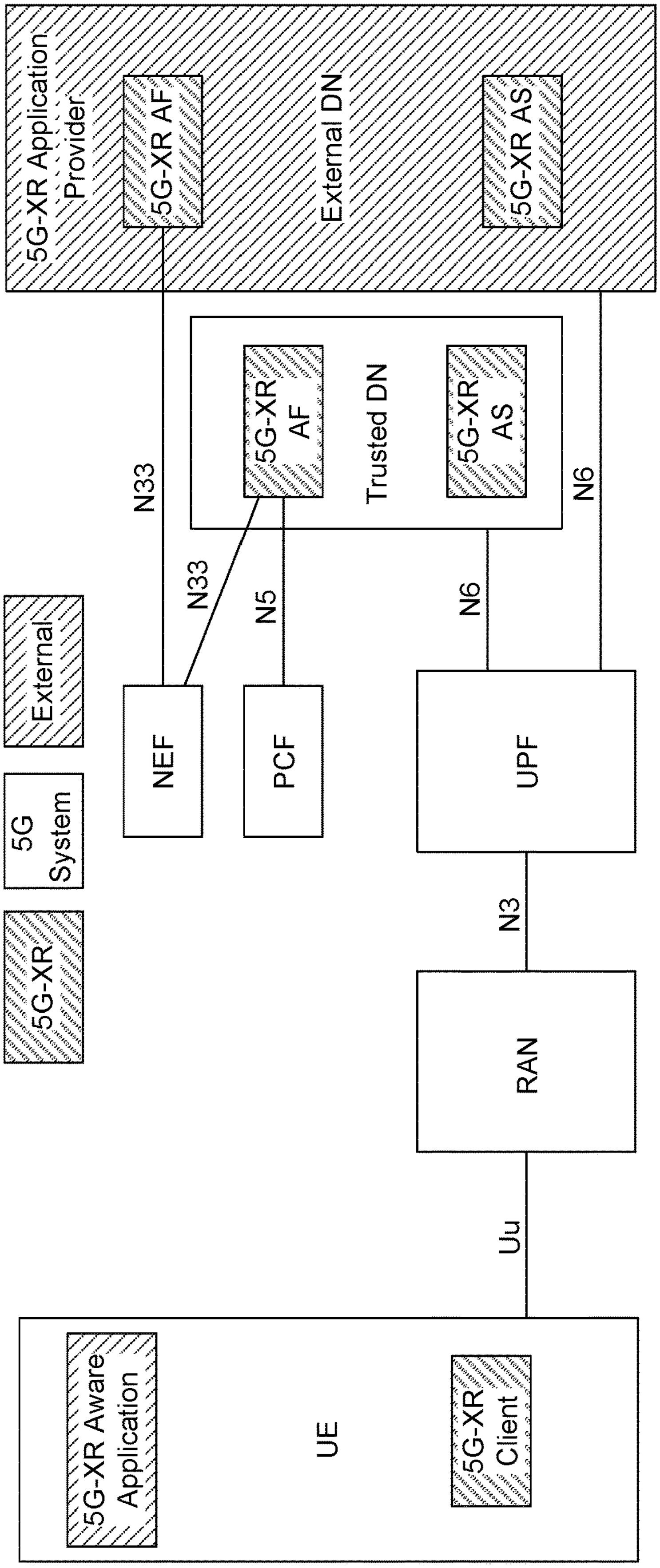
FIG. 20 is a system diagram illustrating an example of 5G-XR functions integrated in a 5G System.

The 3GPP document TR 26.928 [12] presents an architecture to support Extended Reality (XR) as shown in FIG. 20. XR is defined in that document as follows: "Extended reality (XR) refers to all real-and-virtual combined environments and associated human-machine interactions generated by computer technology and wearables. It includes representative forms such as augmented reality (AR), mixed reality (MR), and virtual reality (VR) and the areas interpolated among them." The Gaming low-latency requirements are discussed in TR 26.928. In particular, the document specifies that 45 ms-60 ms are more accurate estimates of acceptable latency in games that are fast paced. In one embodiment, it is proposed to use the methods, procedures, and components described herein to extend the 3GPP proposals.

In FIG. 20, the "5G-XR" client is the receiver of 5G-XR session data that may be accessed through well-defined interfaces/APIs by the 5G-XR Aware Application [12]. This client accesses the 5G-XR AF through the X5 interface (as shown in FIG. 20). This 5G-XR AF is an Application Function similar as defined in 3GPP TS 23.501, clause 6.2.10, dedicated to 5G-XR Services. In addition, the 5G-XR client accesses 5G-XR AS through the X4 interface (as shown in FIG. 20). 5G-XR AS is an Application Server dedicated to 5G-XR Services.

Figure 21:
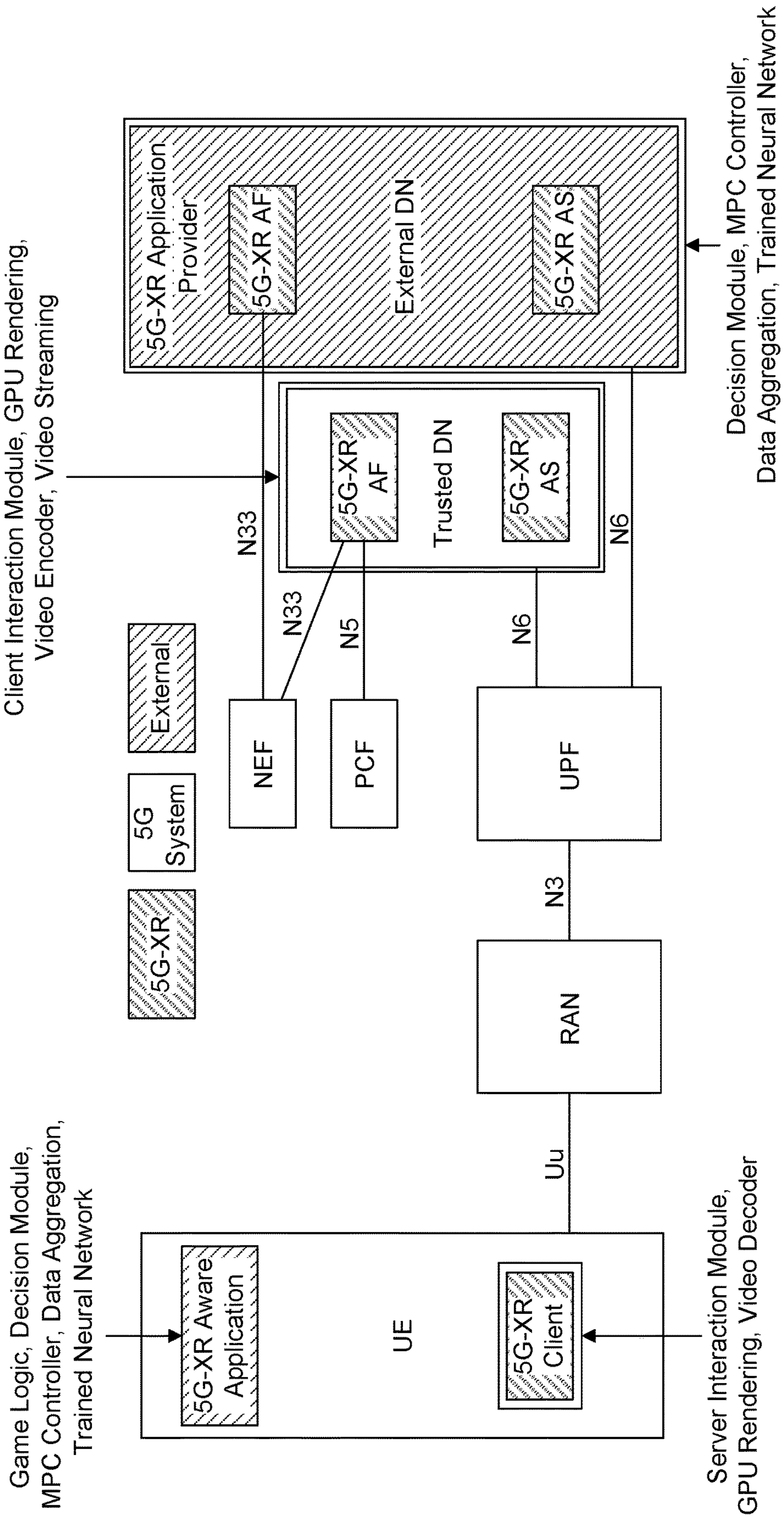
FIG. 21 is a system diagram illustrating a first example of extension of functionality of a 5G System.

FIG. 21 shows how proposed components can be used to extend the functionality of the architecture proposed by the 3GPP TR 26.928. The "5G-XR Client" can be extended by including "Server Interaction Module", "GPU Rendering", and "Video Decoder" components in FIG. 8.

According to 3GPP TR 26.928, AI components are considered specific to the particular XR applications for which they are created. As a result, as shown in FIG. 21, "MPC Controller", Data Aggregation" and "Trained Neural Network" can be part of the 5G-XR Application in this embodiment. In addition, "Game Logic" and the "Decision Module" are also a part of the application.

Similarly, the Trusted DN (Data Network) module can play the role of "Client Interaction Module" as shown in FIG. 21. In addition, the "GPU Rendering", "Video Encoder" and "Video Streaming" are a part of the trusted DN in this embodiment. "Decision Module", "MPC Controller", "Data Aggregation", and "Trained Neural Network" components may extend the functionality of the 5G-XR Application Provider's "External Data Network (DN)" as shown in FIG. 21.

Figure 22:
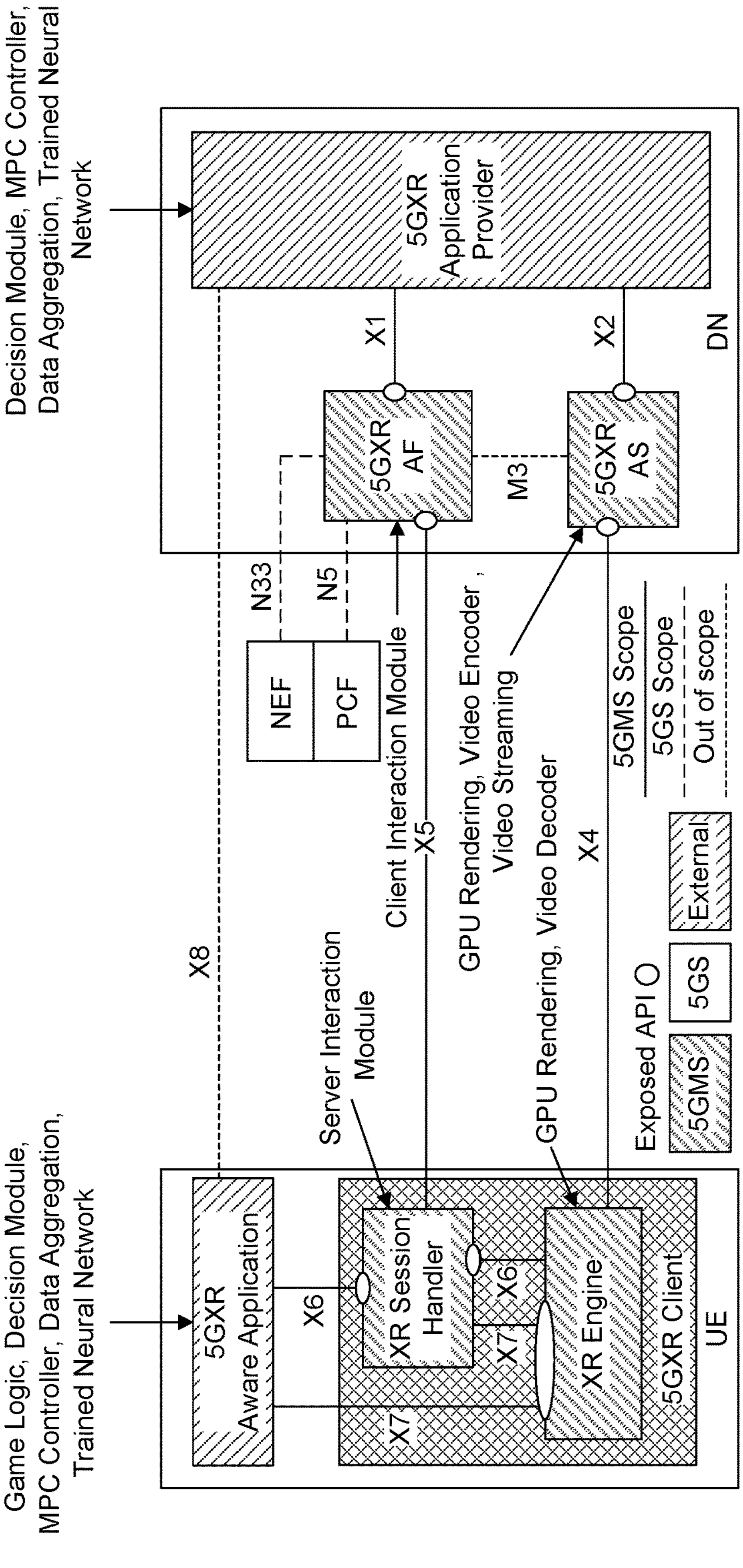
FIG. 22 is a system diagram illustrating a second example of extension of functionality of a 5G System.

FIG. 22 shows one embodiment related to 3GPP 26.928 in more details. The "XR Engine" in the 3GPP architecture can play the role of "GPU Rendering" and "Video Decoder". The "XR Session Handler" can play the role of our "Server Interaction Module". Finally, the "5GXR Aware Application" can embody our components "Game Logic", "Decision Module", "MPC Controller", "Data Aggregation", and "Trained Neural Network".

On the server side as shown in FIG. 22, the "5G XR AS" module can embody our components "GPU Rendering" and "Video Encoder" and "Video Streaming"; the "5G XR AF" module can embody our "Client Interaction Module" and finally the "5GXR Application Provider" module can embody our components "Decision Module", "MPC Controller", "Data Aggregation", and "Trained Neural Network".

Although the embodiments related to FIGS. 20-22 focus on 5G networks, the proposed ideas in this disclosure can be similarly applied to beyond 5G and 6G cellular networks.

IETF Embodiment: Applicability to AR/VR Use Cases

The IETF MOPS Working Group (WG) has recently adapted a document [18] that discusses a media operations use case for an augmented reality application on Edge Computing Infrastructure. This use case envisages a tourist walking around on the grounds of the historical Tower of London wearing an AR headset. This AR headset displays historical scenes in 3D overlaid on the tourist's view of the physical space. The novel methods, procedures and architecture presented above map directly to the afore-mentioned use case.

In the use case, the workload on an AR/VR UE is categorized into two sub-tasks: 1) processing a scene that a tourist visiting the Tower of London is watching in real time; and 2) generation of high-resolution images in greater details.

The first sub-task of processing a scene entails tracking the user's viewpoint and ensuring dynamic registration (alignment) of virtual objects with real objects. The second sub-task of generating high-resolution images entails ensuring visual coherence between virtual objects and real objects in terms of color-matching, occlusion, shading, and/or blurring. In addition, it entails presenting situated visualization to the user.

Figure 23:
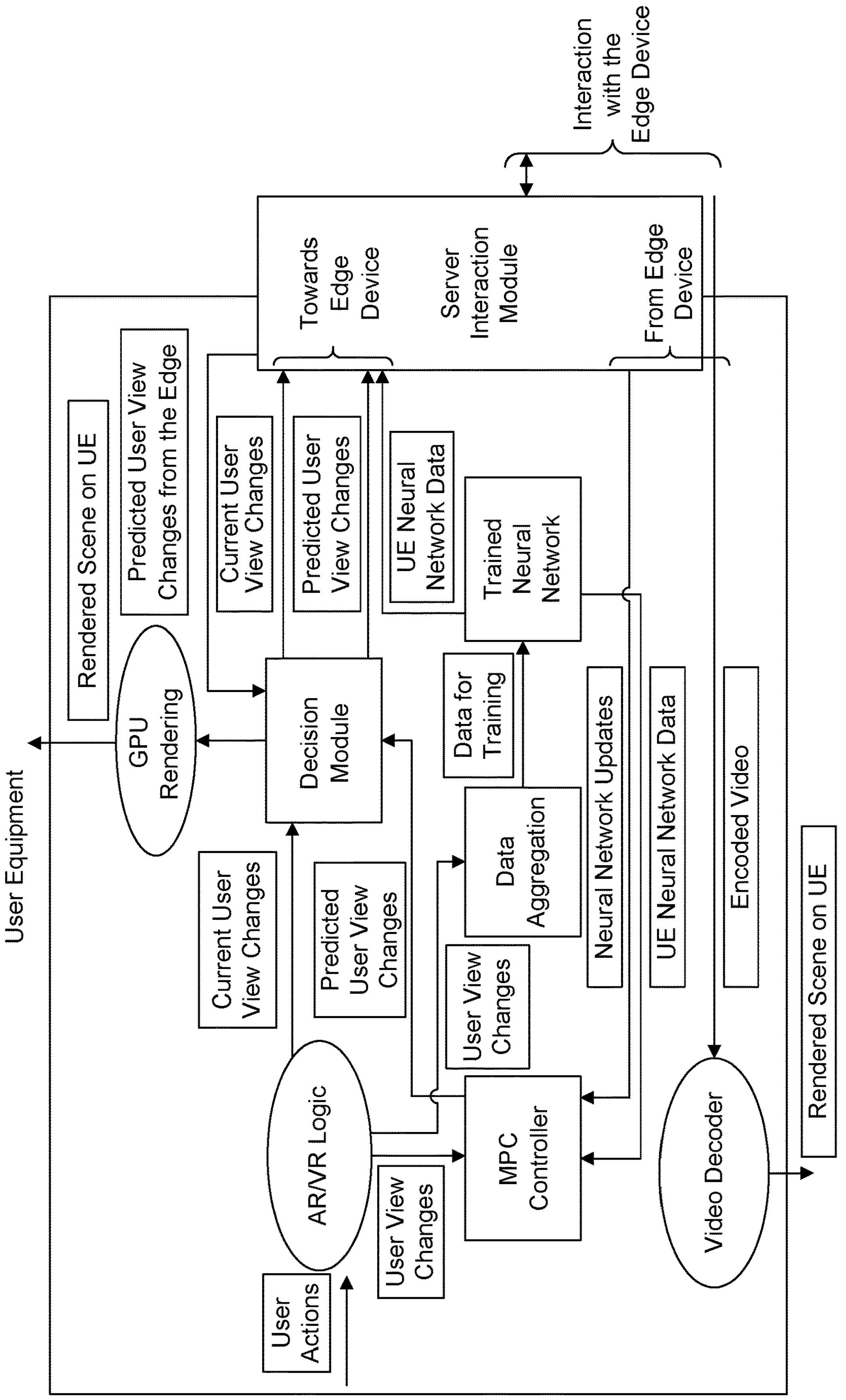
FIG. 23 is a diagram illustrating an example of a Cloud Gaming WTRU mapping to an AR/VR WTRU.
Figure 24:
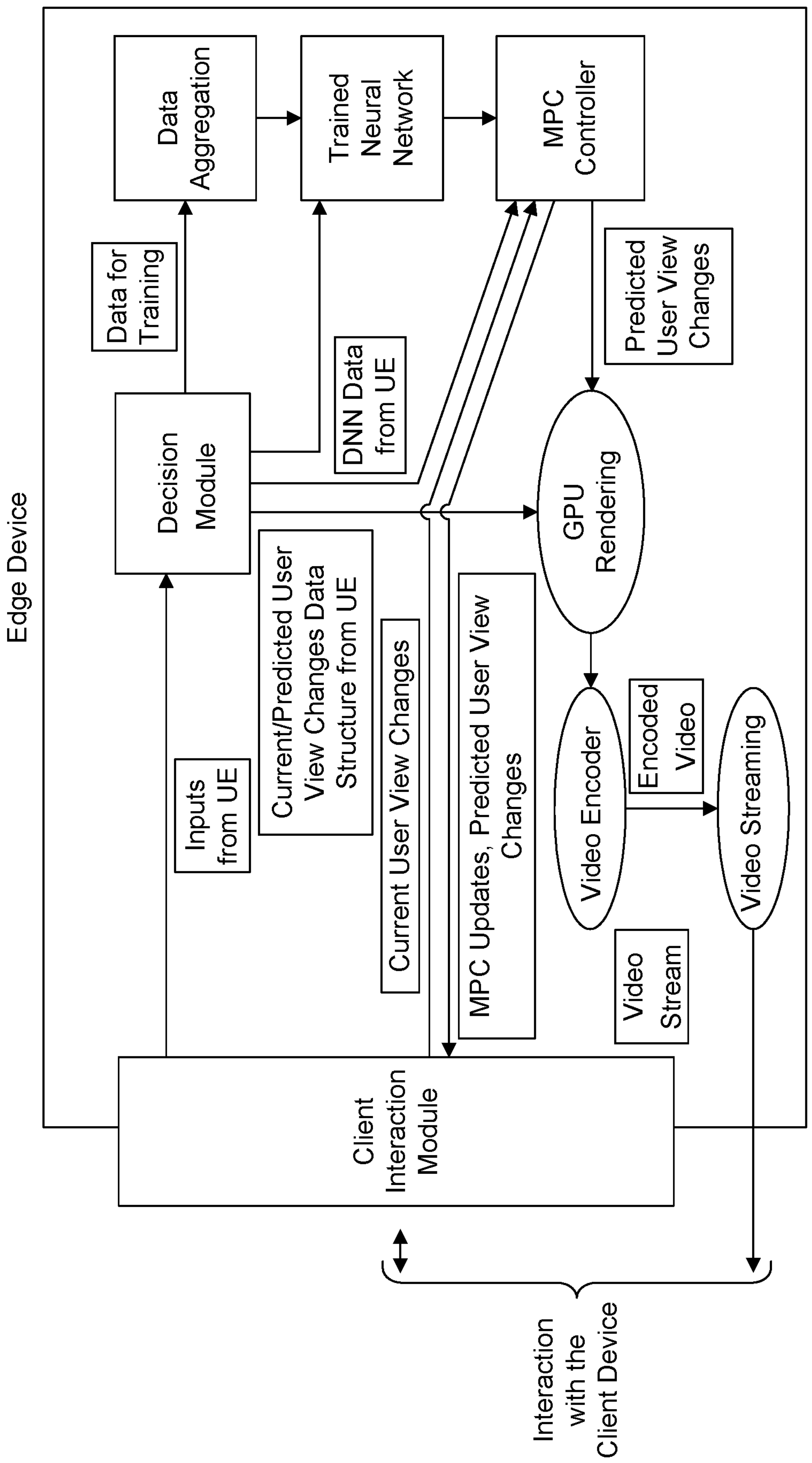
FIG. 24 is a diagram illustrating an example of a Cloud Gaming Edge Device mapping to an Edge device supporting an AR/VR WTRU.

Referring to FIG. 23 and FIG. 24, it is shown that the proposed architecture may map directly to an AR/VR UE in the use case and to Edge device that supports the AR/VR UE, respectively. As shown, it is renamed "Game Logic" component as "AR/VR Logic" component. This component does the processing of a scene as discussed above. The "GPU Renderer" component shown does the generation of high-resolution image as described above. In addition, "Game Actions" is renamed as "User Actions"; "Game World Changes" is renamed as "User View Changes"; "Current Game World Changes" is renamed as "Current User View Changes"; "Predicted Game World Changes" is renamed as "Predicted User View Changes". With this renaming, all other figures are also applicable to this use case.

As such, the scope of the methods, procedures and architecture described/proposed herein includes direct (or indirect) applicability to one or more AR/VR use cases in addition to cloud gaming applications.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU;

(iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented by a wireless transmit/receive unit (WTRU) for wireless communications, the method comprising:

selecting, based at least in part on telemetry data for a wireless path between the WTRU and an Edge device, one of a plurality of rendering-and-prediction procedures for an XR or cloud-gaming session;

transmitting, to the Edge device, a first message including prediction values associated with a neural network and information indicating a type of the prediction values associated with the neural network, wherein the prediction values represent predicted game-world changes or predicted user-view changes for rendering one or more video frames of the XR or cloud-gaming session, the prediction values having been marshaled into one or more byte arrays before transmission;

receiving, from the Edge device, a first acknowledgement message indicating the type of the prediction values associated with the neural network that the Edge device has received;

receiving, from the Edge device, a second message including video data based on the prediction values and the type of the prediction values; and transmitting, to the Edge device, a second acknowledgement message indicating that the video data was received.

2. The method of claim 1, further comprising receiving a third message including a different type of prediction values associated with the neural network.

3. The method of claim 1, further comprising:

unmarshalling the video data received in the second message; and decoding the unmarshalled video data.

4. The method of claim 1, wherein the second message comprises one or more parameters indicating the type of the prediction values.

5. The method of claim 4, wherein the one or more parameters are selected by a decision policy.

6. The method of claim 4, wherein the one or more parameters are received as a byte array.

7. The method of claim 1, wherein the type of the prediction values associated with the neural network comprises a point estimate or a probability distribution for the predicted game-world changes or the predicted user-view changes.

8. The method of claim 2, wherein the different type of prediction values associated with the neural network comprises a point estimate or a probability distribution and is different from the type of the prediction values associated with the neural network.

9. The method of claim 1, further comprising:

determining a first set of procedures performed by the WTRU;

transmitting an acknowledgement in response to the determined first set of procedures; and executing a second set of procedures in response to the determined first set of procedures, wherein any of the first set of procedures or the second set of procedures are provided by a server interaction module.

10. The method of claim 1, further comprising selecting one or more following procedures:

(1) using low-quality video rendering and low-quality prediction; (2) using low-quality video rendering and high-quality prediction; (3) using low-quality prediction and high-quality video rendering; or (4) using high-quality video rendering and high-quality prediction.

11. A wireless transmit/receive unit (WTRU) comprising circuitry, including a processor, a transmitter, a receiver, and memory, the WTRU configured to:

select, based at least in part on telemetry data for a wireless path between the WTRU and an Edge device, one of a plurality of rendering-and-prediction procedures for an XR or cloud-gaming session;

transmit to the Edge device a first message including prediction values associated with a neural network and information indicating a type of the prediction values associated with the neural network, wherein the prediction values represent predicted game-world changes or predicted user-view changes for rendering one or more video frames of the XR or cloud-gaming session, the prediction values having been marshaled into one or more byte arrays before transmission;

receive a first acknowledgement message indicating the type of the prediction values associated with the neural network that an Edge device has received;

receive a second message including video data based on the prediction values and the type of the prediction values; and transmit a second acknowledgement message indicating that the video data was received.

12. The WTRU of claim 11, wherein the WTRU is further configured to receive a third message including a different type of prediction values associated with the neural network.

13. The WTRU of claim 11, wherein the WTRU is further configured to:

unmarshall the video data received in the second message; and decode the unmarshalled video data.

14. The WTRU of claim 11, wherein the second message comprises one or more parameters indicating the type of the prediction values.

15. The WTRU of claim 14, wherein the one or more parameters are selected by a decision policy.

16. The WTRU of claim 14, wherein the one or more parameters are received as a byte array.

17. The WTRU of claim 11, wherein the type of the prediction values associated with the neural network comprises a point estimate or a probability distribution for the predicted game-world changes or the predicted user-view changes.

18. The WTRU of claim 12, wherein the different type of prediction values associated with the neural network comprises a point estimate or a probability distribution and is different from the type of the prediction values associated with the neural network.

19. The WTRU of claim 11, wherein the WTRU is further configured to:

determine a first set of procedures performed by the WTRU;

transmit an acknowledgement in response to the determined first set of procedures; and execute a second set of procedures in response to the determined first set of procedures, wherein any of the first set of procedures or the second set of procedures are provided by a server interaction module.

20. The WTRU of claim 11, wherein the WTRU is further configured to select one or more following procedures:

(1) using low-quality video rendering and low-quality prediction; (2) using low-quality video rendering and high-quality prediction; (3) using low-quality prediction and high-quality video rendering; or (4) using high-quality video rendering and high-quality prediction.

* * * * *